US010885897B2

(12) United States Patent
Nomura et al.

(10) Patent No.: US 10,885,897 B2
(45) Date of Patent: Jan. 5, 2021

(54) INFORMATION PROVIDING DEVICE AND INFORMATION PROVIDING SYSTEM

(71) Applicant: TOYOTA JIDOSHA KABUSHIKI KAISHA, Toyota (JP)

(72) Inventors: Masakazu Nomura, Nagoya (JP); Masato Endo, Nagakute (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 16/054,509

(22) Filed: Aug. 3, 2018

(65) Prior Publication Data
US 2019/0051287 A1  Feb. 14, 2019

(30) Foreign Application Priority Data

Aug. 10, 2017  (JP) .................................. 2017-155827

(51) Int. Cl.
*G10L 15/00* (2013.01)
*G10L 15/26* (2006.01)
(Continued)

(52) U.S. Cl.
CPC .......... *G10L 15/02* (2013.01); *G06F 16/3329* (2019.01); *G06F 16/90332* (2019.01);
(Continued)

(58) Field of Classification Search
CPC ... G10L 15/00; G10L 2015/088; G10L 15/08; G10L 15/22; G10L 15/26;
(Continued)

(56) References Cited

U.S. PATENT DOCUMENTS

| 8,290,520 | B2* | 10/2012 | Ge | ......................... H04L 51/20 455/414.1 |
| 2004/0036622 | A1* | 2/2004 | Dukach | ................... G09F 27/00 340/691.6 |

(Continued)

FOREIGN PATENT DOCUMENTS

| JP | 2004-272355 A | 9/2004 |
| JP | 2010-217318 A | 9/2010 |

(Continued)

OTHER PUBLICATIONS

United States Patent and Trademark Office, U.S. Appl. No. 16/242,351, filed Jan. 8, 2019, 29 pages.

(Continued)

*Primary Examiner* — Olujimi A Adesanya
(74) *Attorney, Agent, or Firm* — Hunton Andrews Kurth LLP

(57) ABSTRACT

An information providing device includes: an utterance contents acquiring unit configured to acquire contents of utterance; a feature word extracting unit configured to extract a feature word; an utterance-time information acquiring unit configured to acquire information on a position or a destination of the vehicle when the feature word has been uttered; an utterance number counting unit configured to count the number of times of utterance of each of a plurality of different words for each of position indicators; a current information acquiring unit configured to acquire information on a position or a destination of a predetermined target vehicle; and an information providing unit configured to provide information to the user based on the counting results of the position indicator corresponding to the position of the target vehicle or the destination indicator corresponding to the destination of the target vehicle from the utterance number counting unit.

8 Claims, 17 Drawing Sheets

(51) Int. Cl.
*G10L 15/02* (2006.01)
*G10L 15/22* (2006.01)
*G06F 16/332* (2019.01)
*G06F 16/9032* (2019.01)
*G06Q 30/02* (2012.01)
*G10L 15/08* (2006.01)
*G10L 25/54* (2013.01)

(52) U.S. Cl.
CPC .......... *G06Q 30/0269* (2013.01); *G10L 15/22* (2013.01); *G10L 15/26* (2013.01); *G10L 25/54* (2013.01); *G10L 2015/088* (2013.01)

(58) Field of Classification Search
CPC .............. G10L 2015/223; G10L 15/02; G10L 15/1822; G10L 15/265; G06F 3/167
See application file for complete search history.

(56) References Cited

U.S. PATENT DOCUMENTS

| | | | | |
|---|---|---|---|---|
| 2008/0103692 | A1* | 5/2008 | Nomura | G01C 21/32 701/532 |
| 2011/0015926 | A1* | 1/2011 | Kim | G10L 15/26 704/235 |
| 2011/0320259 | A1* | 12/2011 | Roumeliotis | G06Q 30/02 705/14.41 |
| 2012/0173245 | A1* | 7/2012 | Miyahara | G09B 29/106 704/275 |
| 2014/0244385 | A1* | 8/2014 | Choi | G06Q 30/0269 705/14.52 |
| 2015/0340030 | A1* | 11/2015 | Sekiguchi | G10L 15/08 704/254 |
| 2016/0061621 | A1* | 3/2016 | Hawkins | G06Q 30/0277 701/408 |
| 2016/0137127 | A1* | 5/2016 | Yokochi | B60K 35/00 348/148 |
| 2019/0050656 | A1* | 2/2019 | Nomura | G06F 3/14 |
| 2019/0050906 | A1* | 2/2019 | Nomura | G01S 19/03 |
| 2019/0050907 | A1* | 2/2019 | Nomura | G06K 9/00369 |

FOREIGN PATENT DOCUMENTS

| | | |
|---|---|---|
| JP | 2012-133530 A | 7/2012 |
| JP | 2016-006607 A | 1/2016 |

OTHER PUBLICATIONS

United States Patent and Trademark Office, Non-Final Office Action issued to U.S. Appl. No. 16/242,351 dated Jun. 12, 2020, 6 pages.
United States Patent and Trademark Office, Notice of Allowance issued to U.S. Appl. No. 16/242,351 dated Sep. 23, 2020, 11 pages.

* cited by examiner

INFORMATION PROVIDING DEVICE AND INFORMATION PROVIDING SYSTEM

INCORPORATION BY REFERENCE

The disclosure of Japanese Patent Application No. 2017-155827 filed on Aug. 10, 2017 including the specification, drawings and abstract is incorporated herein by reference in its entirety.

BACKGROUND

1. Technical Field

The disclosure relates to an information providing device and an information providing system.

2. Description of Related Art

A technique of collecting voice sound in a vehicle, determining contents of conversation based on the collected voice sound, and determining a purpose of actions of an occupant from the determined contents of conversation is known (for example, see Japanese Unexamined Patent Application Publication No. 2012-133530 (JP 2012-133530 A) or the like)

According to this configuration, it is possible to provide information in accordance with a purpose of actions of an occupant.

SUMMARY

However, in JP 2012-133530 A, there is a likelihood that a purpose of actions of an occupant will not be estimated and information will not be able to be provided in accordance with the purpose of actions of the occupant when valid contents of conversation cannot be collected.

The disclosure provides an information providing device and an information providing system that can provide information in accordance with a purpose of actions to an occupant without recognizing specific contents of conversation of the occupant in a target vehicle.

An information providing device according to a first aspect of the disclosure includes: an utterance contents acquiring unit configured to acquire contents of utterance of an occupant in each of a plurality of vehicles; a feature word extracting unit configured to extract a feature word from the contents of utterance acquired by the utterance contents acquiring unit; an utterance-time information acquiring unit configured to acquire information on a position or information on a destination of the vehicle when the feature word has been uttered; an utterance number counting unit configured to count the number of times of utterance of each of a plurality of different words which are extracted as the feature word by the feature word extracting unit for each of position indicators including a road link, a crossing, and an area corresponding to the position of the vehicle or for each of destination indicators including a point of interest and an area corresponding to the destination of the vehicle; a current information acquiring unit configured to acquire information on a position or information on a destination of a predetermined target vehicle boarded by a user; and an information providing unit configured to provide information to the user based on the counting results of the position indicator corresponding to the position of the target vehicle or the destination indicator corresponding to the destination of the target vehicle from the utterance number counting unit.

According to this aspect, for example, the number of times of utterance of each of a plurality of words which are extracted as feature words of the contents of utterance of occupants in a plurality of vehicles is counted for each of position indicators such as a road link corresponding to the positions of the vehicles or for each of destination indicators such as a point of interest (POI) corresponding to destinations of the vehicles. Here, there is a high likelihood that a word of which the number of times of utterance counted for each of position indicators corresponding to the position of the corresponding vehicle or for each of destination indicators corresponding to the destination of the corresponding vehicle is relatively large is a word about which occupants of a vehicle passing through the corresponding place or a vehicle traveling to the corresponding destination relatively often talk and is a word associated with a movement intention of an occupant moving in a vehicle from the macro-perspective. Accordingly, by using counting results for a position indicator corresponding to a position of a target vehicle or a destination indicator corresponding to a destination of a target vehicle, it is possible to provide information in accordance with a purpose of actions without recognizing specific contents of conversation of users in the target vehicle.

In the aspect, the utterance number counting unit may be configured to count the number of times of utterance of each of a plurality of different words which are extracted as the feature word from the contents of utterance after a predetermined time point by the feature word extracting unit for each of position indicators corresponding to the position of the vehicle or for each of destination indicators corresponding to the destination of the vehicle.

According to this aspect, the number of times of utterance for each of a plurality of words which are extracted as a feature word from relatively new contents of utterance after a predetermined time point is counted. Accordingly, by appropriately setting the predetermined time point, it is possible to appropriately provide information in accordance with a purpose of actions in consideration of a latest situation of a position indicator corresponding to a position of a target vehicle or a destination indicator corresponding to a destination of the target vehicle.

In the aspect, the information providing unit may be configured to provide information associated with a word of which the number of times of utterance of each of the plurality of words counted for each of position indicators corresponding to the position of the target vehicle or for each of destination indicators corresponding to the destination of the target vehicle by the utterance number counting unit is relatively large to the user.

According to this aspect, information associated with a word of which the number of times of utterance counted for a place through which a target vehicle passes or a destination to which the target vehicle travels is relatively large can be provided to a user of the target vehicle as information associated with a movement intention of the user moving in the target vehicle.

In the aspect, the information providing device may further include a storage unit configured to store a word of which the number of times of utterance of each of the plurality of words counted for each of position indicators or for each of destination indicators by the utterance number counting unit is relatively large in correlation with the position indicator or the destination indicator, and the information providing unit may be configured to provide information associated with a word which is stored in the storage unit in correlation with the position indicator corresponding to the position of the target vehicle or the destination indicator corresponding to the destination of the target vehicle to the user.

According to this aspect, a word of which the number of times of utterance counted for a certain position indicator or a certain destination indicator is relative large among a plurality of words is stored in correlation with the position indicator or the destination indicator. That is, a feature word map is constructed in which a word (a feature word) about which occupants of a vehicle passing through a place corresponding to a position indicator or a vehicle traveling to a destination corresponding to a destination indicator relatively often talk is correlated with the position indicator or the destination indicator. Accordingly, information associated with a word correlated to a position indicator corresponding to a position of a target vehicle or a destination indicator corresponding to a destination of the target vehicle in the feature word map can be provided as information in accordance with a purpose of actions of a user in the target vehicle.

In the aspect, the information providing unit may be configured to provide the information to the user by delivering the information to a digital signage installed near a road on which the target vehicle is located and displaying the information on the digital signage.

According to this aspect, it is possible to provide information in accordance with a movement intention to a user in a target vehicle via a digital signage near a road on which the target vehicle is located. Since a digital signage is easily included in a field of view of a user as a driver of a target vehicle, it is possible to encourage the driver of the target vehicle to recognize information.

In the aspect, the information providing unit may be configured to provide the information to the user by delivering the information to a mobile terminal carried by the user or the target vehicle.

According to this aspect, it is possible to provide information in accordance with a purpose of actions of a user by display on a display or outputting of voice sound in a mobile terminal carried by the user in a target vehicle, display on a display or outputting of voice sound in the target vehicle, or the like.

An information providing system according to a second aspect of the disclosure includes: an utterance contents acquiring unit disposed in each of a plurality of vehicles and configured to acquire contents of utterance of an occupant; a feature word extracting unit disposed in each of the plurality of vehicles and configured to extract a feature word from the contents of utterance acquired by the utterance contents acquiring unit; an utterance-time information acquiring unit disposed in a server that is able to communicate with the plurality of vehicles and configured to acquire position information or destination information of the vehicle when the feature word has been uttered; an utterance number counting unit disposed in the server and configured to count the number of times of utterance of each of a plurality of different words which are extracted as the feature word by the feature word extracting unit for each of position indicators including a road link, a crossing, and an area corresponding to the position of the vehicle or for each of destination indicators including a point of interest and an area corresponding to the destination of the vehicle; a current information acquiring unit disposed in the server and configured to acquire position information or destination information of a predetermined target vehicle boarded by a user; and an information providing unit disposed in the server and configured to provide information to the user based on the counting results of the position indicator corresponding to the position of the target vehicle or the destination indicator corresponding to the destination of the target vehicle from the utterance number counting unit.

According to this aspect, similarly to the above-mentioned aspect, it is possible to provide information in accordance with a purpose of actions without recognizing specific contents of conversation of users in a target vehicle. Since a feature word is extracted for each vehicle, contents of utterance of occupants in each vehicle are not transmitted to a server side and it is possible to construct a system in consideration of privacy of occupants in each vehicle.

An information providing system according to a third aspect of the disclosure includes: a vehicle including a first processor programmed to acquire contents of utterance of an occupant and to extract a feature word from the contents of utterance; and a server including a communication device that communicates with the vehicle and a second processor programmed to acquire position information or destination information of the vehicle when the feature word has been uttered, to count the number of times of utterance of each of a plurality of different words which are extracted as the feature word for each of position indicators including a road link, a crossing, and an area corresponding to the position of the vehicle or for each of destination indicators including a point of interest and an area corresponding to the destination of the vehicle, to acquire position information or destination information of a predetermined target vehicle boarded by a user, and to provide information to the user based on the counting results of the position indicator corresponding to the position of the target vehicle or the destination indicator corresponding to the destination of the target vehicle.

According to the above-mentioned embodiment, it is possible to provide an information providing device and an information providing system that can provide information in accordance with a purpose of actions to an occupant of a target vehicle without recognizing specific contents of conversation of the occupant.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings.

[Configuration of Movement Information Management System]

First, a configuration of a movement information management system 1 according to an embodiment will be described below with reference to FIGS. 1 to 4.

Figure 1:
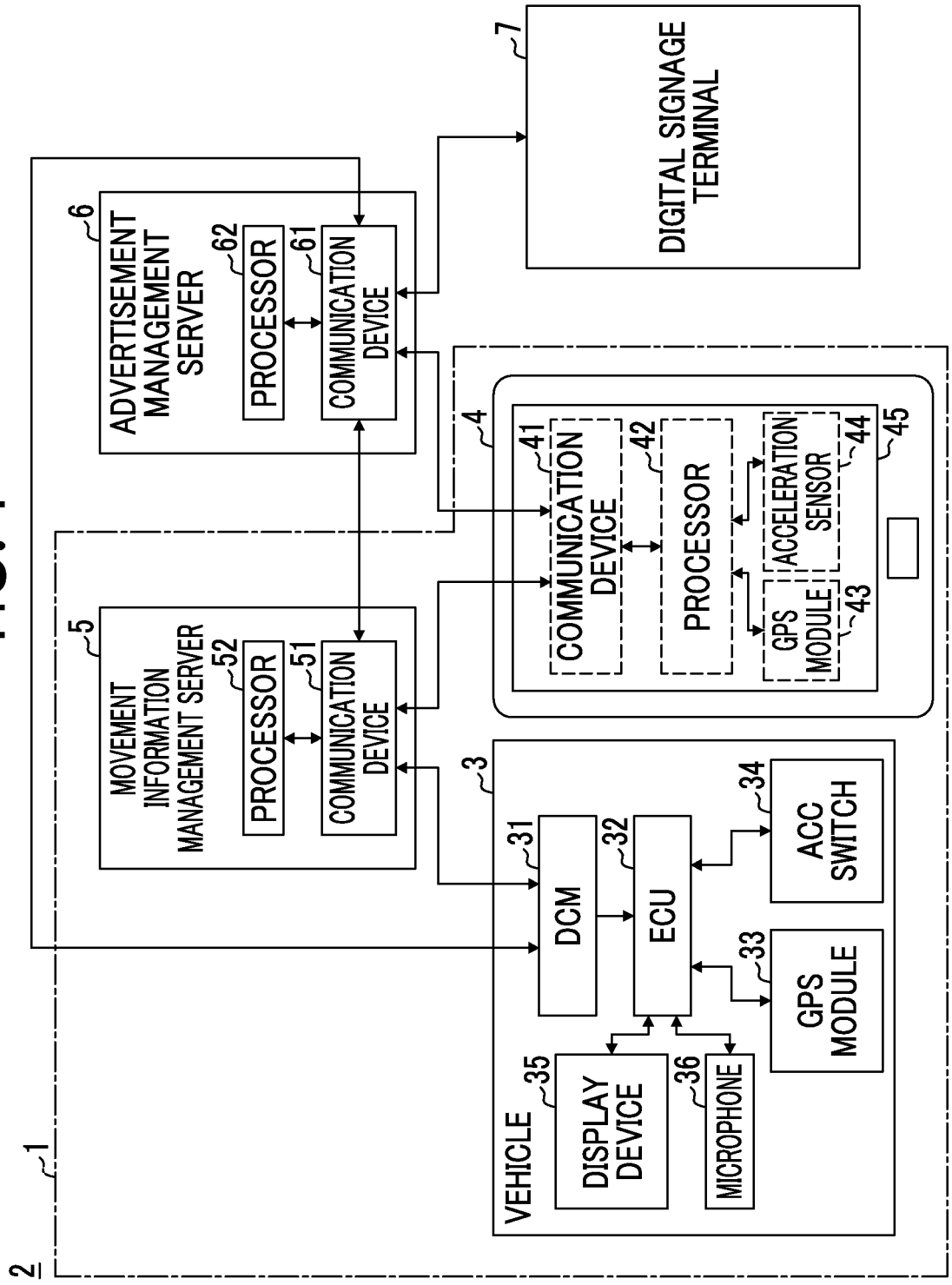
FIG. 1 is a diagram schematically illustrating an example of a configuration of a movement information management system and an advertisement management system according to an embodiment.
Figure 2:
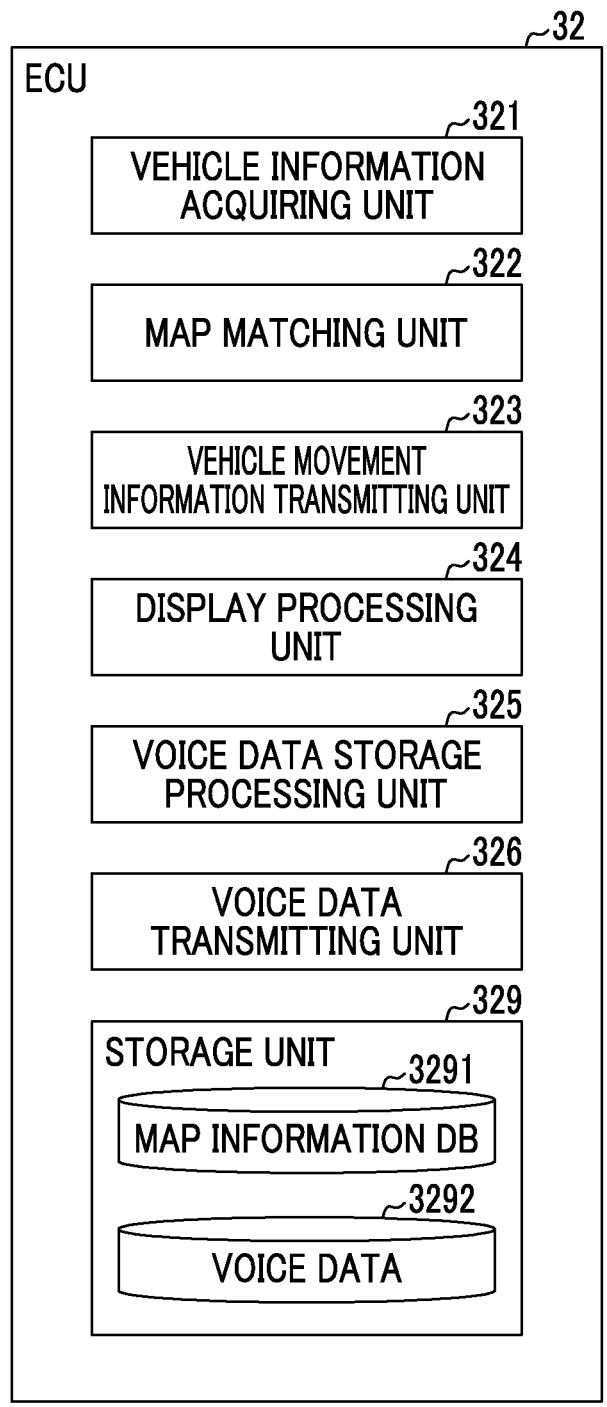
FIG. 2 is a functional block diagram illustrating an example of a functional configuration of a vehicle (an ECU)
Figure 3:
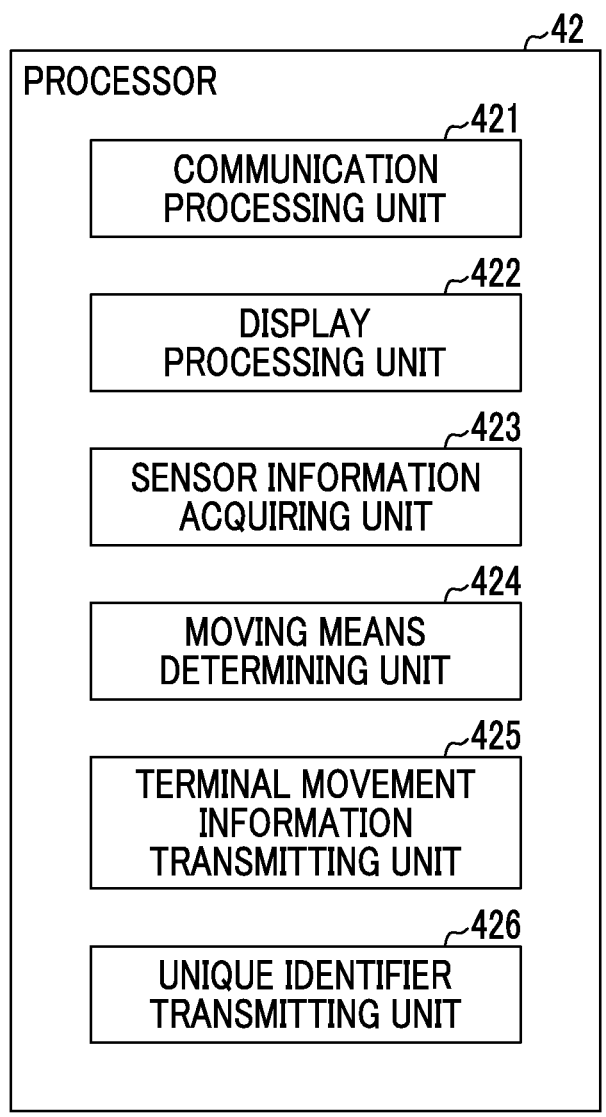
FIG. 3 is a functional block diagram illustrating an example of a functional configuration of a mobile terminal (a processor)
Figure 4:
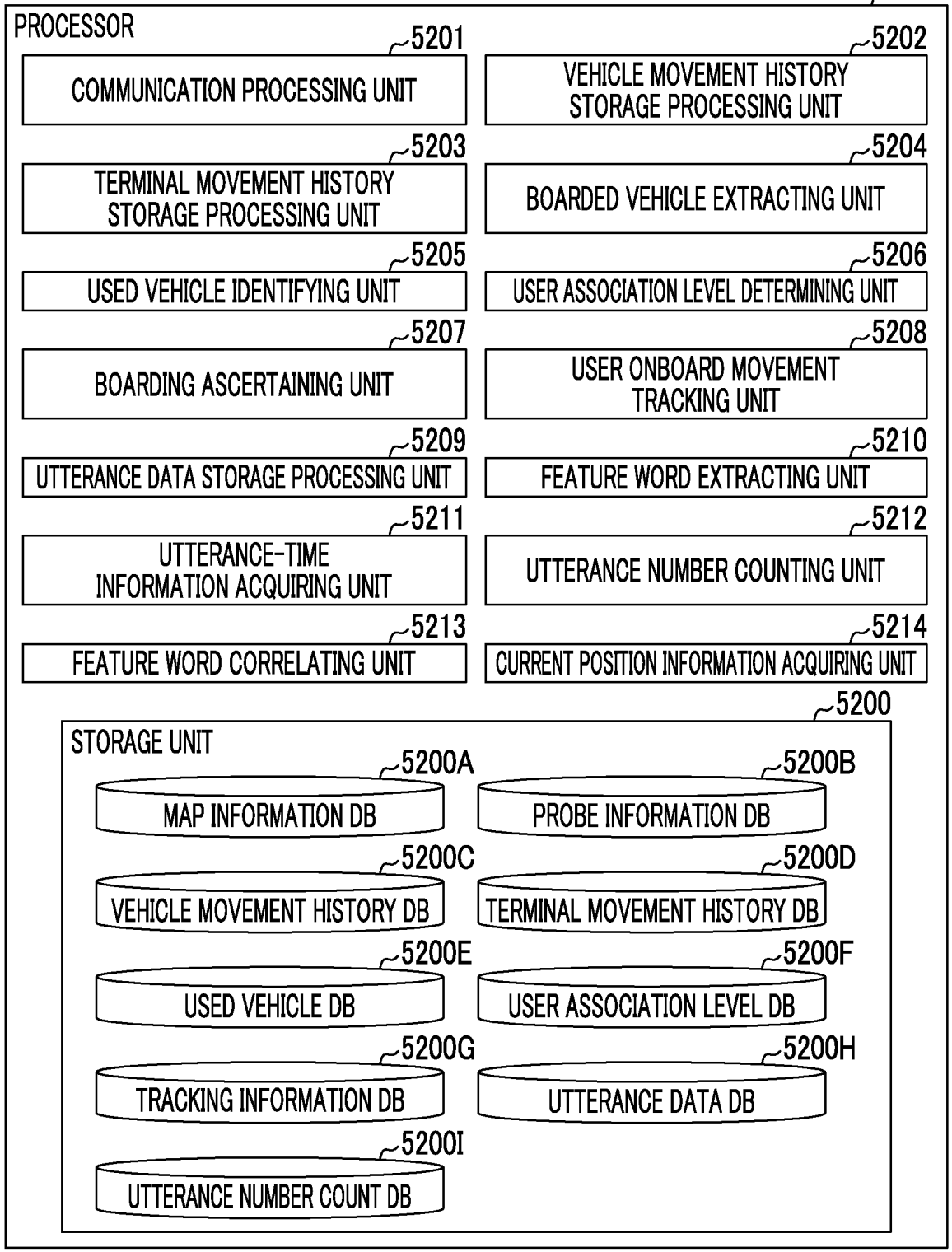
FIG. 4 is a functional block diagram illustrating an example of a functional configuration of a movement information management server.

FIG. 1 is a diagram schematically illustrating a configuration of the movement information management system 1 and an advertisement management system 2 according to the embodiment. FIG. 2 is a functional block diagram schematically illustrating an example of a functional configuration of a vehicle 3 (an ECU 32) according to the embodiment. FIG. 3 is a functional block diagram schematically illustrating an example of a functional configuration of a mobile terminal 4 (a processor 42) according to the embodiment. FIG. 4 is a functional block diagram schematically illustrating an example of a functional configuration of a movement information management server 5 (a processor 52).

The movement information management system 1 includes a plurality of vehicles 3, a plurality of mobile terminals 4 that are carried by users of the plurality of vehicles 3 or the like, and a movement information management server 5 that is communicatively connected to the plurality of vehicles 3 and the plurality of mobile terminals 4. Although details thereof will be described later, the movement information management system 1 collects a variety of information such as movement histories including position information from the plurality of vehicles 3 and the plurality of mobile terminals 4 and manages information associated with movement of the plurality of vehicles 3 and the plurality of mobile terminals 4. The movement information management system 1 collects contents of utterance in each vehicle from the plurality of vehicles 3, extracts feature words with a high likelihood that the corresponding feature word is associated with a movement intention of occupants in each of the plurality of vehicles 3 from the contents of utterance, and maintains information for delivery of information using the extracted feature words.

Since configurations of the plurality of vehicles 3 associated with the movement information management system 1 and the advertisement management system 2 are substantially the same, one vehicle 3 is representatively illustrated in the drawings. Similarly, since configurations of the plurality of mobile terminals 4 associated with the movement information management system 1 and the advertisement management system 2 are substantially the same, one mobile terminal 4 is representatively illustrated in the drawings. The plurality of mobile terminals 4 may include mobile terminals 4 of users other than users using the plurality of vehicles 3.

Each vehicle 3 includes a data communication module (DCM) 31, an electronic control unit (ECU) 32, a global positioning system (GPS) module 33, an ACC (accessory power source) switch 34, a display device 35, and a microphone 36.

The DCM 31 is a communication device that bidirectionally communicates with the movement information management server 5 and an advertisement management server 6 via a predetermined communication network, for example, a mobile phone network with a plurality of base stations as terminals or an Internet network. The DCM 31 is communicatively connected to various ECUs including the ECU 32 via an onboard network such as a controller area network (CAN).

The ECU 32 is an electronic control unit that performs various control processes associated with predetermined functions in the vehicle 3. The functions of the ECU 32 may be embodied by arbitrary hardware, arbitrary software, or a combination thereof, and the ECU 32 may be constituted mainly, for example, by a microcomputer including a central processing unit (CPU), a random access memory (RAM), a read only memory (ROM), an auxiliary storage device, and an input-output interface (I/O). The ECU 32 includes a vehicle information acquiring unit 321, a map matching unit 322, a vehicle movement information transmitting unit 323, a display processing unit 324, a voice data storage processing unit 325, and a voice data transmitting unit 326 as functional units which are embodied, for example, by causing the CPU to execute one or more programs stored in the ROM or the auxiliary storage device. For example, the ECU 32 may include a storage unit 329 which is a storage area defined in the auxiliary storage device. A map information database (DB) 3291 and a voice data 3292 are stored in the storage unit 329.

Some functions of the ECU 32 may be assigned to one or more other ECUs.

The vehicle information acquiring unit 321 acquires information on a vehicle state input from the GPS module 33, the ACC switch 34, and the like from a buffer in the RAM or the like. Specifically, the vehicle information acquiring unit 321 acquires position information of the vehicle 3 which is input from the GPS module 33. The vehicle information acquiring unit 321 acquires a signal associated with an ON/OFF state (an ON signal or an OFF signal) of the ACC switch 34 which is input from the ACC switch 34.

The map matching unit 322 identifies a road link corresponding to the position information of the vehicle 3, that is, a road link on which the vehicle 3 is currently located, based on the map information DB 3291 stored in the storage unit 329 and the position information of the vehicle 3 which is acquired by the vehicle information acquiring unit 321. For example, identification information, that is, link identifiers (ID), may be defined for a plurality of road links constituting a road network included in the map information DB 3291 in advance. The map matching unit 322 identifies a link ID of the road link on which the vehicle 3 is currently located.

The map information DB 3291 includes geographic information system (GIS) data including nodes corresponding to crossings, road links corresponding to roads between neighboring crossings, that is, connecting the nodes, and lines or polygons corresponding to planimetric features such as buildings or roads.

The vehicle movement information transmitting unit 323 generates information on movement (vehicle movement information) of the vehicle 3 and transmits the generated vehicle movement information to the movement information management server 5 via the DCM 31. The vehicle movement information includes position information of the vehicle 3, time information corresponding to the position information of the vehicle 3, information on a road link corresponding to the position information of the vehicle 3 which is identified by the map matching unit 322, and information on starting and stopping of the vehicle 3. Hereinafter, in this embodiment, information (ACC-ON information) indicating that the ACC switch 34 has been switched from an OFF state to an ON state is employed as the information on starting of the vehicle 3, and information (ACC-OFF information) indicating that the ACC switch 34 has been switched from the ON state to the OFF state is employed as the information on stopping of the vehicle 3.

The vehicle movement information which is transmitted from the vehicle 3 to the movement information management server 5 may not include time information corresponding to the position information of the vehicle 3. In this case, the movement information management server 5 can add a time at which the vehicle movement information has been transmitted from the vehicle 3, a time at which the vehicle movement information has been received by the movement information management server 5, an estimated time at which the vehicle 3 is estimated to be present at an actual position corresponding to the position information and which is calculated from these times, or the like as the time information corresponding the position information of the vehicle 3 to the vehicle movement information received from the vehicle 3.

The display processing unit 324 performs a process of displaying a predetermined information screen on the display device 35 in response to an operation which is performed by an occupant such as a driver of the vehicle 3. For example, the display processing unit 324 may perform a process of displaying advertisement information delivered from the advertisement management server 6 which will be described later to the vehicle 3 on the display device 35.

The voice data storage processing unit 325 stores voice data in the vehicle 3 which is input from the microphone 36 in the storage unit 329. Specifically, the voice data storage processing unit 325 performs a process of adding time information (for example, a time stamp) when the voice data has been acquired, the position information of the vehicle 3, and information on a road link (that is, a link ID) corresponding to the position of the vehicle 3 and storing the resultant voice data in the storage unit 329 (the voice data 3292).

The link ID may not be added to the voice data 3292 stored in the storage unit 329. In this case, the link ID can be added by the movement information management server 5.

The voice data transmitting unit 326 transmits the voice data 3292 stored in the storage unit 329 to the movement information management server 5 via the DCM 31. For example, the voice data transmitting unit 326 may transmit the voice data 3292 to the movement information management server 5 whenever new voice data 3292 is stored, or may periodically transmit voice data 3292 which has been collected to a certain extent to the movement information management server 5.

The voice data 3292 which is uploaded to the movement information management server 5 by the voice data transmitting unit 326 may be deleted from the storage unit 329.

The GPS module 33 receives GPS signals which are transmitted from three or more satellites, preferably, four or more satellites, above the vehicle 3 and measures the position of the vehicle 3 in which the GPS module 33 is mounted. The GPS module 33 is communicatively connected to the ECU 32 via a one-to-one communication line or an onboard network such as a CAN, and the measured position information of the vehicle 3 is input to the ECU 32 or the like.

The ACC switch 34 switches an accessory power source of the vehicle 3 to ON/OFF states in response to a predetermined operation which is performed by an occupant such as a driver of the vehicle 3. For example, the ACC switch 34 is switched to the ON/OFF states in response to an operation of a power switch (a button type switch for operating the ACC switch 34 and an ignition switch (an IG switch)) which is provided in an instrument panel near a steering wheel of a driver seat in the vehicle. The ACC switch 34 is communicatively connected to the ECU 32 or the like via a one-to-one communication line or an onboard network such as a CAN, and a state signal thereof (an ON signal/OFF signal) is input to the ECU 32.

The display device 35 is disposed at a position which can be easily seen by an occupant such as a driver of the vehicle 3, for example, in a central upper part of the instrument panel inside of the vehicle, and displays various information screens or various operation screens under the control of the ECU 32 (specifically, the display processing unit 324). The display device 35 is, for example, a touch panel type liquid crystal display.

The microphone 36 is disposed, for example, in the instrument penal or a center console, collects voice sound including contents of utterance of an occupant in the vehicle 3 under the control of the ECU 32, and outputs voice data. The voice data including the contents of utterance of an occupant in the vehicle 3 is input to the ECU 32.

A voice input device including the microphone 36 may have a communication function of communicating with the movement information management server 5 and may transmit voice data including time information and position information to the movement information management server 5 without it passing through the ECU 32. Voice data acquired via a microphone of a mobile terminal 4 of a user in the vehicle 3 instead of the microphone 36 may be transmitted from the mobile terminal 4 to the movement information management server 5. In this case, as will be described later, the movement information management server 5 (specifically, a boarding ascertaining unit 5207 which will be described later) determines whether the user of the mobile terminal 4 is in the vehicle 3 (specifically, the vehicle 3 which has been identified as being used by the user in advance). When it is determined that the user is in the vehicle 3, the movement information management server 5 can handle the voice data received from the mobile terminal 4 as voice data including contents of utterance in the vehicle 3.

Examples of the mobile terminal 4 include a mobile phone, a smartphone, and a tablet terminal which are carried by a user of a vehicle 3. The mobile terminal 4 includes a communication device 41, a processor 42, a GPS module 43, an acceleration sensor 44, and a touch panel display (hereinafter simply referred to as a "display") 45.

The communication device 41 is a device that bidirectionally communicates with the movement information management server 5 and the advertisement management server 6 via a predetermined communication network, for example, via a mobile phone network or an Internet network with a plurality of base stations as terminals under the control of the processor 42. For example, the communication device 41 is a mobile communication module corresponding to a predetermined communication standard such as long term evolution (LTE), 4G (4th Generation), or 5G (5th Generation).

The processor 42 performs various control processes in the mobile terminal 4. The processor 42 is mainly constituted, for example, by a computer including a CPU, a RAM, a ROM, an auxiliary storage device, and an I/O. The processor 42 includes a communication processing unit 421, a display processing unit 422, a sensor information acquiring unit 423, a moving means determining unit 424, a terminal movement information transmitting unit 425, and a unique identifier transmitting unit 426 as functional units which are embodied, for example, by causing the CPU to execute one or more programs stored in the ROM or the auxiliary storage device.

The unique identifier transmitting unit 426 is an element associated with the advertisement management system 2 and details thereof will be described later.

The communication processing unit 421 controls the communication device 41 such that it transmits and receives various signals to and from the movement information management server 5.

The display processing unit 422 displays various images on the display 45. For example, the display processing unit 422 displays various graphical user interfaces (GUIs) as an operation screen on the display 45. For example, the display processing unit 422 displays advertisement information delivered from the advertisement management server 6 which will be described later on the display 45.

The sensor information acquiring unit 423 acquires sensor information which is input from various sensors such as the GPS module 43 and the acceleration sensor 44 from a buffer in the RAM. Specifically, the sensor information acquiring unit 423 acquires position information of the mobile terminal 4 which is input from the GPS module 43. The sensor information acquiring unit 423 acquires information on an acceleration (acceleration information) of the mobile terminal 4 which is input from the acceleration sensor 44.

The moving means determining unit 424 determines whether a user carrying the mobile terminal 4 is moving in a vehicle (hereinafter simply referred to as a "vehicle as moving means") other than public transportation (a bus) as moving means or by other moving means (on foot, on a bicycle, on a train, in a bus, or the like) using an arbitrary method. For example, the moving means determining unit 424 may perform the determination, for example, by employing a discriminator that has been subjected to machine learning in advance to distinguish between a case in which the user is moving in a vehicle as moving means and a case in which the user is moving by moving means other than a vehicle based on the acceleration information which is input from the acceleration sensor 44. For example, the moving means determining unit 424 may determine whether the user is moving in a vehicle as moving means or by moving means other than a vehicle based on the position information of the mobile terminal 4 which is input from the GPS module 43 in addition to or instead of the acceleration information which is input from the acceleration sensor 44.

The public transportation in this embodiment does not include a taxi. That is, a vehicle other than the public transportation can include a taxi. The moving means determining unit 424 may simply determine whether the user of the mobile terminal 4 is moving in a vehicle including public transportation (a bus) as moving means or is moving by other moving means. Accordingly, for example, the moving means determining unit 424 can determine whether the user carrying the mobile terminal 4 is moving in a vehicle including public transportation as moving means or is moving by other moving means by simply determining a moving speed of the mobile terminal 4 and whether the mobile terminal is moving on rails.

The terminal movement information transmitting unit 425 generates information on movement of the mobile terminal 4 (terminal movement information), that is, movement of a user carrying the mobile terminal 4, and transmits the generated terminal movement information to the movement information management server 5 via the communication processing unit 421. The terminal movement information can include the position information of the mobile terminal 4 and the determination result from the moving means determining unit 424 (for example, whether there is an onboard movement tag).

In this way, the moving means determining unit 424 determines whether the user of the mobile terminal 4 is moving in a vehicle as moving means. The terminal movement information transmitting unit 425 of the mobile terminal 4 transmits the terminal movement information of the mobile terminal 4 when the moving means determining unit 424 determines that the user of the mobile terminal 4 is moving in a vehicle as moving means to the movement information management server 5 such that it can be distinguished from the terminal movement information of the mobile terminal 4 when the moving means determining unit 424 determines that the user of the mobile terminal 4 is not moving in the vehicle 3 as moving means. Accordingly, the terminal movement information of the mobile terminal 4 when it is determined that the user is moving in the vehicle as moving means is transmitted from the mobile terminal 4 to the movement information management server 5 such that it can be distinguished from the terminal movement information of the mobile terminal 4 when it is determined that the user is not moving in a vehicle as moving means. Accordingly, since an amount of information of the terminal movement history which needs to be processed by a used vehicle identifying unit 5205 which will be described later on the movement information management server 5 side decreases, it is possible to reduce a processing load for identifying the vehicle 3 which is used by the user of the mobile terminal 4 and to complete the processing more quickly.

The GPS module 43 receives GPS signals which are transmitted from three or more satellites, preferably, four or more satellites, above the mobile terminal 4 and measures the position of the mobile terminal in which the GPS module 43 is mounted. The measured position information of the mobile terminal 4 is input to the processor 42.

The position information of the mobile terminal 4 may be acquired by base station positioning based on exchange of signals with base stations instead of or in addition to the GPS positioning using the GPS module 43.

The acceleration sensor 44 is, for example, an existing detector that detects an acceleration of the mobile terminal 4 using a micro electro mechanical system (MEMS) technique.

The movement information management server 5 includes a communication device 51 and a processor 52.

The communication device 51 is a device that bidirectionally communicates with vehicles 3, mobile terminals 4, and the advertisement management server 6 which will be described later via a predetermined communication network, for example, via a mobile phone network or an Internet network with a plurality of base stations as terminals, under the control of the processor 52 (specifically, a communication processing unit 5201).

The processor 52 performs various control processes in the movement information management server 5. The processor 52 may be mainly constituted, for example, by one or more server computers including a CPU, a RAM, a ROM, an auxiliary storage device, and an I/O. The processor 52 includes a communication processing unit 5201, a vehicle movement history storage processing unit 5202, a terminal movement history storage processing unit 5203, a boarded vehicle extracting unit 5204, a used vehicle identifying unit 5205, a user association level determining unit 5206, a boarding ascertaining unit 5207, a user onboard movement tracking unit 5208, an utterance data storage processing unit 5209, a feature word extracting unit 5210, an utterance-time information acquiring unit 5211, an utterance number counting unit 5212, and a feature word correlating unit 5213 as functional units which are embodied, for example, by causing the CPU to execute one or more programs stored in the ROM or the auxiliary storage device. The processor 52 also includes, for example, a storage unit 5200 as a storage area which is defined in an auxiliary storage device of a server computer or an external storage device connected to the server computer. A map information DB 5200A, a probe information DB 5200B, a vehicle movement history DB 5200C, a terminal movement history DB 5200D, a used vehicle DB 5200E, a user association level DB 5200F, a tracking information DB 5200G, an utterance data DB 5200H, and an utterance number count DB 5200I are stored in the storage unit 5200.

The communication processing unit 5201 controls the communication device 51 such that it transmits and receives various signals (such as a control signal and an information signal) to and from a plurality of vehicles 3 and a plurality of mobile terminals 4.

The vehicle movement history storage processing unit 5202 performs a process of processing vehicle movement information which is sequentially received from the plurality of vehicles 3 by the communication processing unit 5201 and storing the processed information as movement histories of the vehicles 3 (vehicle movement histories) in the vehicle movement history DB 5200C. For example, the vehicle movement history storage processing unit 5202 generates information on a movement history (trip information) for every period from starting to stopping of each vehicle 3, that is, for each trip, based on time-series data of the vehicle movement information of the plurality of vehicles 3 which is stored in the probe information DB 5200B. In other words, the vehicle movement history storage processing unit 5202 generates trip information from a departure point to a destination for each trip of the vehicle 3. Specifically, the vehicle movement history storage processing unit 5202 determines starting of the vehicle 3 based on the ACC-ON information included in the vehicle movement information, and defines the position information of the vehicle 3 included in the vehicle movement information including the ACC-ON information as a start point (a departure point) of one trip of the vehicle 3. The vehicle movement history storage processing unit 5202 defines the position information of the vehicle 3 which is included in latest vehicle movement information including the ACC-OFF information in the vehicle movement information after the corresponding vehicle movement information in a time series as an end point (a destination) of one trip of the vehicle 3. Then, the vehicle movement history storage processing unit 5202 combines two pieces of vehicle movement information associated with the start point and the end point of one trip of the vehicle 3 and a plurality of pieces of vehicle movement information (a vehicle movement information group) between the two pieces of vehicle movement information in a time series and generates trip information. The vehicle movement history storage processing unit 5202 stores the generated trip information of each vehicle 3 as a movement history of the vehicle 3 in the vehicle movement history DB 5200C.

The process which is performed by the vehicle movement history storage processing unit 5202 may be performed in real time to correspond to the probe information which is sequentially received from a plurality of vehicles 3 by the communication processing unit 5201, or may be periodically performed on non-processed probe information which has been collected to a certain extent. The probe information including vehicle movement information which is received from the plurality of vehicles 3 by the communication processing unit 5201 is stored in the probe information DB 5200B. Unique identification information (trip ID) is defined for trip information stored in the vehicle movement history DB 5200C, and specific trip information in the vehicle movement history DB 5200C can be searched for using the trip ID.

The terminal movement history storage processing unit 5203 performs a process of storing terminal movement information which is sequentially received from a plurality of mobile terminals 4 by the communication processing unit 5201 as movement histories of the mobile terminals 4 (terminal movement histories) in the terminal movement history DB 5200D (an example of a terminal movement history storing unit).

The process which is performed by the terminal movement history storage processing unit 5203 may be performed in real time to correspond to the terminal movement information which is sequentially received from a plurality of mobile terminals 4 by the communication processing unit 5201, or may be periodically performed on non-processed terminal movement information which has been collected to a certain extent in a buffer of the RAM or the like.

Figure 5:
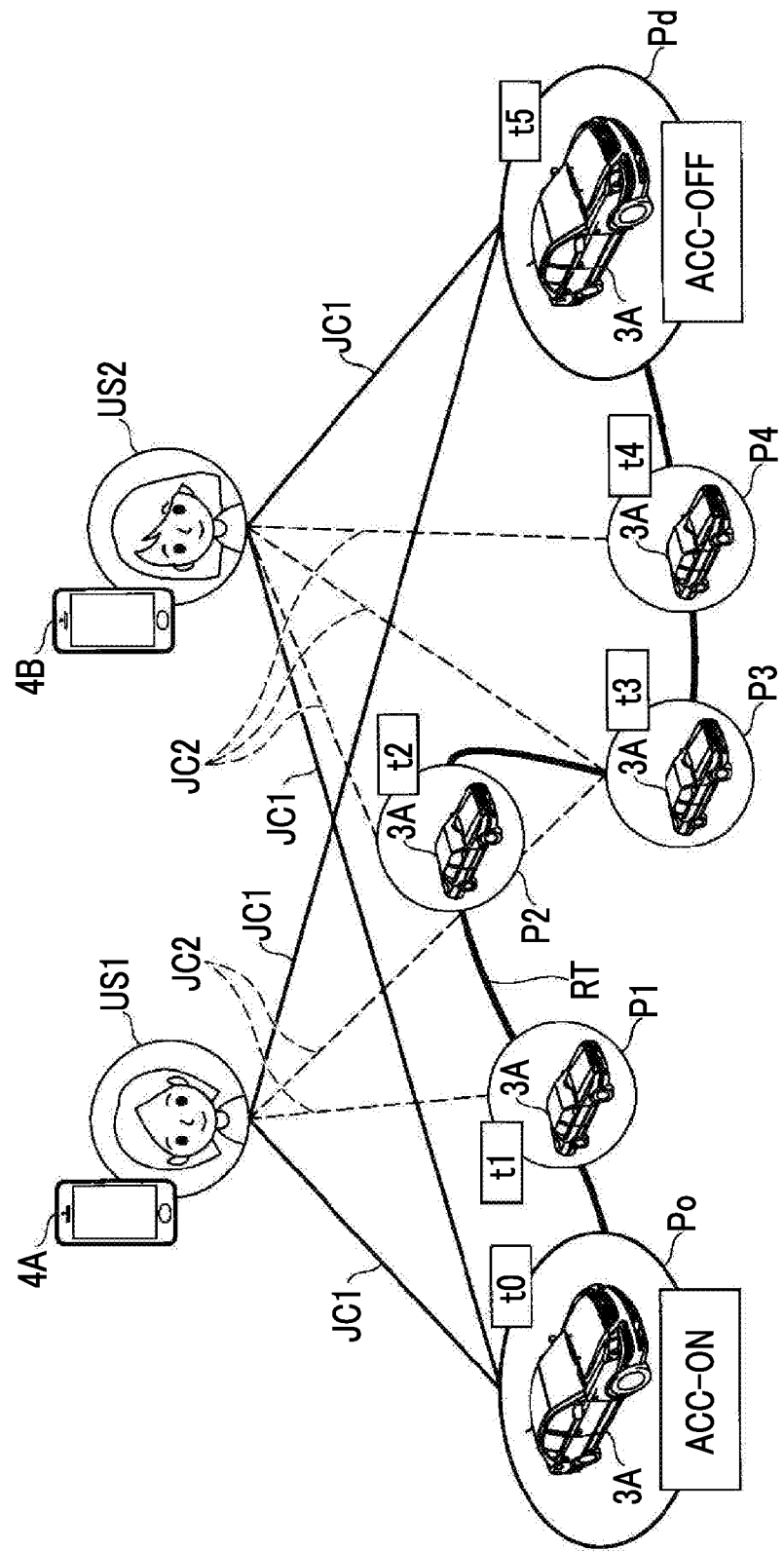
FIG. 5 is a diagram illustrating a processing routine which is performed by a boarded vehicle extracting unit of the movement information management server.

The boarded vehicle extracting unit 5204 extracts a vehicle 3 which has been boarded by a user of each of a plurality of mobile terminals 4 based on the vehicle movement histories of a plurality of vehicles 3 and the terminal movement histories of a plurality of mobile terminals 4 which are stored in the vehicle movement history DB 5200C and the terminal movement history DB 5200D. In other words, the boarded vehicle extracting unit 5204 extracts a vehicle 3 which has been boarded by a user of each of the plurality of mobile terminals 4 among the plurality of vehicles 3. For example, FIG. 5 is a diagram illustrating the process which is performed by the boarded vehicle extracting unit 5204. In this example, users US1 and US2 of mobile terminals 4A and 4B of the plurality of mobile terminals 4 have boarded a vehicle 3A of the plurality of vehicles 3 together and are moving from a departure point Po as the departure point to a destination Pd as the destination.

As illustrated in FIG. 5, the boarded vehicle extracting unit 5204 determines whether two conditions are satisfied based on the terminal movement histories of the mobile terminals 4A and 4B in the terminal movement history DB 5200D and the vehicle movement history of the vehicle 3A in the vehicle movement history DB 5200C, that is, a trip information group.

Specifically, first, the boarded vehicle extracting unit 5204 determines whether a staying record condition JC1 indicating that there are staying records of the users US1 and US2 at the departure point Po and the destination Pd of the vehicle 3A has been satisfied. More specifically, the boarded vehicle extracting unit 5204 determines whether the terminal movement history of the mobile terminal 4A indicates that the mobile terminal 4A has stayed in the vicinity of the departure point Po when the vehicle 3A has started, that is, within a predetermined time (for example, 10 minutes) before the ACC switch has been turned on (time t0 in FIG. 5), in the trip information of the vehicle 3A. The boarded vehicle extracting unit 5204 also determines whether the terminal movement history of the mobile terminal 4A indicates that the mobile terminal 4A has stayed in the vicinity of the destination Pd when the vehicle 3A has stopped, that is, within a predetermined time (for example, 10 minutes) after the ACC switch has been turned off (time t5 in FIG. 5), in the trip information of the vehicle 3A. Accordingly, it can be determined that the user US1 of the mobile terminal 4A has stayed in the vicinity of each of the departure point Po and the destination Pd of the vehicle 3A in time periods in which the vehicle 3A has been parked at the departure point Po and the destination Pd. By performing the same process on the terminal movement history of the mobile terminal 4B of the user US2, it can be determined that the user US2 has stayed in the vicinity of the departure point Po and the destination Pd of the vehicle 3B in time periods in which the vehicle 3A has been parked at the departure point Po and the destination Pd.

Second, the boarded vehicle extracting unit 5204 determines whether a synchronous movement condition JC2 indicating that the users US1 and US2 are present at the same positions on a movement route RT at the same time as the vehicle 3A has been satisfied. More specifically, the boarded vehicle extracting unit 5204 compares a data group of vehicle movement information (time information and position information) between the departure point Po and the destination Pd included in the trip information of the vehicle 3A with a data group of terminal movement information (time information and position information) included in the terminal movement history of the mobile terminal 4A in the same time period as the data group. Then, the boarded vehicle extracting unit 5204 determines that the synchronous movement condition JC2 has been satisfied when the vehicle movement information of the vehicle 3A and the terminal movement information of the mobile terminal 4A match each other at a plurality of points such that the mobile terminal 4A and the vehicle 3A can be determined to be present at the same positions at the same times. For example, as illustrated in FIG. 5, in this example, it can be determined that the vehicle 3A and the mobile terminal 4A are present at two points P1 and P3 on the movement route RT at the same times. Accordingly, the boarded vehicle extracting unit 5204 can determine that the user US1 of the mobile terminal 4A is in the vehicle 3A between the departure point Po and the destination Pd. For example, as illustrated in FIG. 5, in this example, it can be determined that the vehicle 3A and the mobile terminal 4B are present at three points P2 to P4 on the movement route RT at the same times. Accordingly, by performing the same process on the terminal movement history of the mobile terminal 4B of the user US2, the boarded vehicle extracting unit 5204 can determine that the user US2 of the mobile terminal 4B is in the vehicle 3A along with the user US1 between the departure point Po and the destination Pd.

In this way, the boarded vehicle extracting unit 5204 can extract a vehicle 3 which has been boarded by a user of a mobile terminal 4 by searching the terminal movement histories of a plurality of mobile terminals 4 for the trip information of the vehicle 3 in which both the staying record condition JC1 and the synchronous movement condition JC2 are satisfied.

The boarded vehicle extracting unit 5204 may extract a vehicle 3 which has been boarded by a user of a mobile terminal 4 using only the synchronous movement condition JC2 without using the staying record condition JC1. The boarded vehicle extracting unit 5204 may perform the above-mentioned process in real time at the same time as updating the vehicle movement history DB 5200C and the terminal movement history DB 5200D in the vehicle movement information storage processing unit 5202 and the terminal movement history storage processing unit 5203. The boarded vehicle extracting unit 5204 may periodically perform the above-mentioned process on non-processed vehicle movement histories and terminal movement histories which have been collected to a certain extent.

Figure 6:
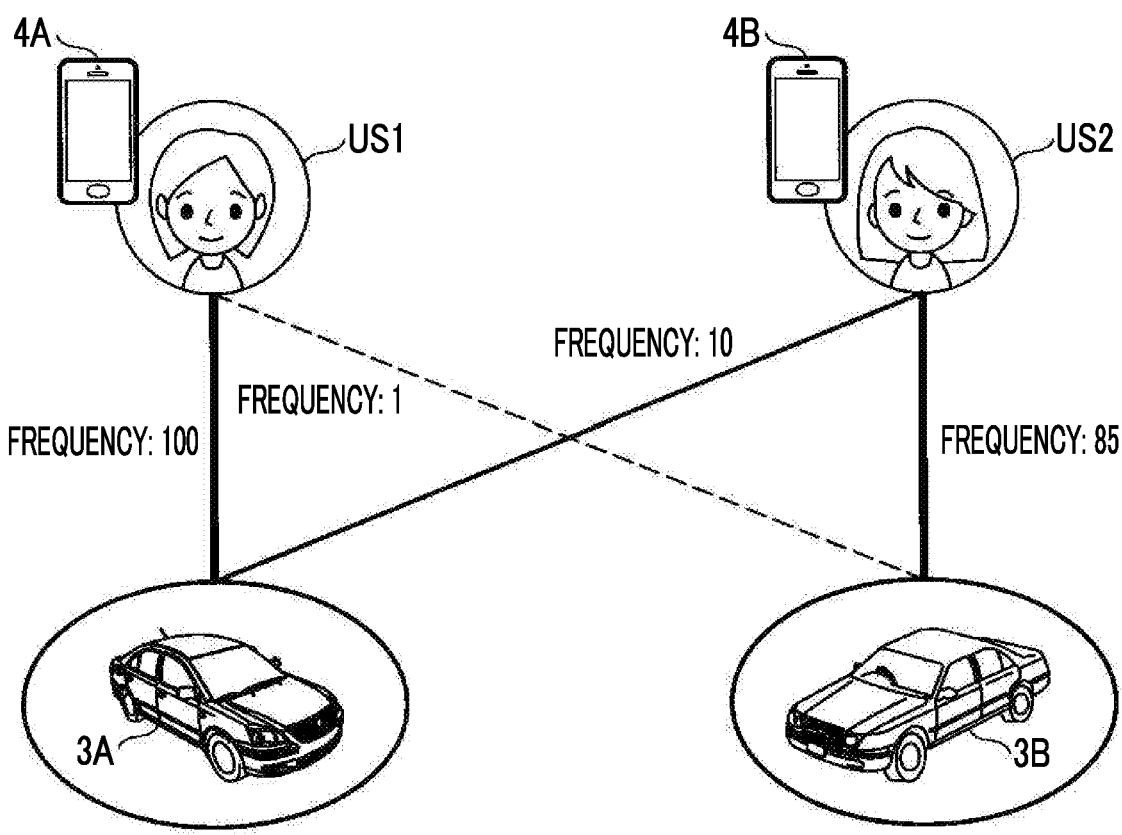
FIG. 6 is a diagram illustrating a used vehicle DB which is constructed in the movement information management server (a storage unit)

The used vehicle identifying unit 5205 identifies a vehicle 3 which is used by a user of each of a plurality of mobile terminals 4. A vehicle 3 which is used by a user of a mobile terminal 4 includes a vehicle 3 which is used as a driver and a vehicle 3 which is used as a passenger of a driver. Specifically, the used vehicle identifying unit 5205 identifies a vehicle 3 which is used by a user of each of a plurality of mobile terminals 4 from the vehicles 3 which were boarded, that is, which have been boarded, by the users of the plurality of mobile terminals 4 and which are extracted by the boarded vehicle extracting unit 5204. The used vehicle identifying unit 5205 stores the plurality of mobile terminals 4 or the users of the plurality of mobile terminals 4 in correlation with the identified vehicles 3 which are used by the users of the plurality of mobile terminals 4 in the used vehicle DB 5200E. Hereinafter, a case in which mobile terminals 4 and vehicles 3 which are used by users of the mobile terminals 4 are correlated will be mainly described. At this time, the used vehicle identifying unit 5205 also stores a boarding frequency (the number of times of boarding) of the identified vehicles 3 which are used by the users of the plurality of mobile terminals 4 in the used vehicle DB 5200E. That is, the used vehicle identifying unit 5205 constructs the used vehicle DB 5200E such that a plurality of mobile terminals 4 and vehicles 3 which are used by users of the plurality of mobile terminals 4 are correlated using a boarding frequency (the number of times of boarding) indicating a relationship therebetween. For example, FIG. 6 is a diagram schematically illustrating a data model of the user vehicle DB 5200E which is constructed by the used vehicle identifying unit 5205. In this example, it is assumed that the boarded vehicle extracting unit 5204 has extracted the vehicles 3A and 3B of the plurality of vehicles 3 as a vehicle 3 which has been boarded by the users US1 and US2 of the mobile terminals 4A and 4B of the plurality of mobile terminals 4.

As illustrated in FIG. 6, the used vehicle DB 5200E can be constructed as a graph type database. Specifically, the used vehicle DB 5200E in this example can be constructed as a graph type database in which the mobile terminals 4A and 4B or the users US1 and US2 and the vehicles 3A and 3B are set as nodes and the nodes corresponding to the mobile terminals 4A and 4B or the users US1 and US2 and the nodes corresponding to the vehicles 3A and 3B are correlated using the boarding frequency (the number of times of boarding) as information (relation information) indicating a relationship therebetween. More specifically, the mobile terminal 4A or the user US1 thereof and the vehicles 3A and 3B which are nodes are correlated using relation information indicating that the number of times of boarding is 100 and 1. The mobile terminal 4B or the user US2 thereof and the vehicles 3A and 3B which are nodes are correlated using relation information indicating that the number of times of boarding is 10 and 85.

For example, even when a user of a mobile terminal 4 has boarded a vehicle 3 just once, the used vehicle identifying unit 5205 may identify that the user of the mobile terminal 4 uses the vehicle 3. For example, when the number of times the user of the mobile terminal 4 has boarded the vehicle 3, that is, the boarding frequency, is equal to or greater than a predetermined threshold value (for example, five times), the used vehicle identifying unit 5205 may determine that the user of the mobile terminal 4 uses the vehicle 3. In this case, the used vehicle identifying unit 5205 can register the user of the mobile terminal 4 in the used vehicle DB 5200E in a state (a temporarily identified state) in which the user of the mobile terminal 4 is temporarily identified as using the vehicle 3 when the boarding frequency is lower than a predetermined threshold value. For example, as illustrated in FIG. 6, since the number of times of boarding of the vehicle 3B by the user US1 of the mobile terminal 4A is one which is very small, the vehicle 3B is correlated with the mobile terminal 4A or the user US1 thereof in the temporarily identified state (see a dotted line in the drawing).

As described above, the boarded vehicle extracting unit 5204 performs a process of extracting a user who has boarded one of a plurality of vehicles 3 in real time with updating of the vehicle movement history DB 5200C and the terminal movement history DB 5200D or periodically. Accordingly, the used vehicle identifying unit 5205 updates the used vehicle DB 5200E depending on the results of the extraction process which is sequentially performed by the boarded vehicle extracting unit 5204. Specifically, when a user of a mobile terminal 4 is in a vehicle 3 which has not been boarded by the user and the vehicle 3 is newly extracted by the boarded vehicle extracting unit 5204, the used vehicle identifying unit 5205 stores the user of the mobile terminal 4 and the vehicle 3 in the used vehicle DB 5200E in correlation with each other. When a user of a mobile terminal 4 is in a vehicle 3 which has been already boarded by the user and the vehicle 3 is newly extracted by the boarded vehicle extracting unit 5204, the used vehicle identifying unit 5205 updates the boarding frequency of the relation information in the used vehicle DB 5200E.

In this way, the used vehicle identifying unit 5205 can construct the used vehicle DB 5200E such that a plurality of mobile terminals 4 or users thereof and a plurality of vehicles 3 are correlated using a relationship of a boarding frequency, and identify the vehicles 3 which are used by the users of the plurality of mobile terminals 4. The used vehicle identifying unit 5205 can update the boarding frequency (the number of times of boarding) as the relation information between the mobile terminals 4 or the users thereof and the vehicles 3 in the used vehicle DB 5200E based on the vehicles 3 which have been boarded by the users of the plurality of mobile terminals 4 and which are sequentially extracted by the boarded vehicle extracting unit 5204.

In this way, the used vehicle identifying unit 5205 identifies the vehicles 3 which are used by the users of the plurality of mobile terminals 4 among the plurality of vehicles 3 based on the vehicle movement histories of the plurality of vehicles 3 which are stored in the vehicle movement history DB 5200C and the terminal movement histories of the plurality of mobile terminals 4 which are stored in the terminal movement history DB 5200D. For example, the used vehicle identifying unit 5205 can compare the vehicle movement histories of the vehicles 3 with the terminal movement histories of the mobile terminals 4 and determine that a user of a mobile terminal 4 is in a vehicle 3 with respect to a part or all of the vehicle movement history in which the position information and the time information of both histories substantially match each other. Accordingly, the used vehicle identifying unit 5205 can identify a vehicle 3 which is being used by the user among the vehicles 3 which have been boarded by the user of the mobile terminal 4. Accordingly, for example, the movement information management system 1 can more satisfactorily identify a user of a mobile terminal 4 who is in a vehicle 3 by monitoring the position information of the mobile terminal 4 and the position information of the identified vehicle 3 which is used by the user of the mobile terminal 4.

The boarded vehicle extracting unit 5204 extracts the vehicles 3 which have been boarded by the users of the plurality of mobile terminals 4 among a plurality of vehicles 3 based on the vehicle movement histories of the plurality of vehicles 3 which are stored in the vehicle movement history DB 5200C and the terminal movement histories of the plurality of mobile terminals 4 which are stored in the terminal movement history DB 5200D. Specifically, when the terminal movement history of a mobile terminal 4 indicates that the mobile terminal 4 has stayed in the vicinity of a departure point and a destination in time periods in which the vehicle 3 is parked at the departure point and the destination in a movement route from the departure point to the destination included in the vehicle movement history of the vehicle 3 and indicates that the mobile terminal 4 has been present at the same positions on the movement route at the same times as the vehicle 3, the boarded vehicle extracting unit 5204 extracts the vehicle 3 as being boarded by the user of the mobile terminal 4. Then, the used vehicle identifying unit 5205 identifies the vehicles 3 which are being used by the users of a plurality of mobile terminals 4 among the vehicles 3 which have been boarded by the users of the plurality of mobile terminals 4 and which are extracted by the boarded vehicle extracting unit 5204. Accordingly, the boarded vehicle extracting unit 5204 can determine whether a user of a mobile terminal 4 is in a vehicle 3 by determining whether the mobile terminal 4 has stayed at both the departure point and the destination of the vehicle 3 and whether the mobile terminal 4 has been present at the same positions as the vehicle 3 at the same times on the movement route with respect to a movement route including a departure point and a destination of each vehicle 3 included in the vehicle movement histories, and extract the vehicle 3 which has been boarded by the user of the mobile terminal 4 among the plurality of vehicles 3. Accordingly, the used vehicle identifying unit 5205 can identify vehicles 3 which are being used by users of a plurality of mobile terminals 4 among the vehicles 3 which have been boarded by the users of the plurality of mobile terminals 4.

The used vehicle identifying unit 5205 identifies the vehicles 3 of which the boarding frequency is equal to or greater than a predetermined value among the vehicles 3 which have been boarded by the users of the plurality of mobile terminals 4 and which are extracted by the boarded vehicle extracting unit 5204 as the vehicles 3 which are used by the users of the plurality of mobile terminals 4. Accordingly, the used vehicle identifying unit 5205 can identify the vehicles 3 of which the boarding frequency is relatively large among the vehicles 3 which have been boarded by the users of the plurality of mobile terminals 4 and which are extracted by the boarded vehicle extracting unit 5204 as the vehicles 3 which are used by the users of the plurality of mobile terminals 4. Accordingly, the movement information management system 1 can prevent, for example, a situation in which the process of determining whether a user is in a vehicle 3 is uselessly performed by identifying a vehicle 3 of which the board frequency is very small such as a vehicle 3 which has been accidentally boarded by a user of a mobile terminal 4 as the vehicle 3 which is used by the user of the mobile terminal 4.

The used vehicle DB 5200E may be constructed as a general relational database instead of a graph type database.

The user association level determining unit 5206 determines an association level between users of a plurality of mobile terminals 4 based on the used vehicle DB 5200E. For example, when the same vehicle 3 is identified as a vehicle which is used by users of two or more mobile terminals 4 in the used vehicle DB 5200E, the user association level determining unit 5206 can determine that the two or more users have a relatively familiar relationship involving boarding the vehicle 3 together or lending or borrowing the vehicle 3, that is, a mutual association.

In this case, the user association level determining unit 5206 can determine the association level between the two or more users based on the boarding frequency in the vehicle 3 of the two or more users. For example, when a difference in the boarding frequency between two users using the same vehicle 3 is relatively small, it may be predicted that the two users frequently board the vehicle 3 together or the number of times of borrowing or lending the vehicle 3 is large, and thus the user association level determining unit 5206 can determine that the mutual association level therebetween is high. On the other hand, when the difference in the boarding frequency therebetween is relatively large, it may be predicted that the two users do not frequently board the vehicle 3 together or the number of times of borrowing or lending the vehicle 3 is relatively small, and thus the user association level determining unit 5206 can determine that the mutual association level therebetween is low. For example, the user association level determining unit 5206 may determine to which of graduated association levels in which the association level increases as the difference in the boarding frequency decreases the association level of two or more users correspond based on one or more threshold values provided for the difference in the boarding frequency between the users.

As described above, since the used vehicle DB 5200E is sequentially updated, the user association level determining unit 5206 sequentially performs a process of determining the association level between the users of the plurality of mobile terminals 4 in response to updating of the used vehicle DB 5200E. Then, the user association level determining unit 5206 generates information on the association (association information) between the users of the plurality of mobile terminals 4 such as the above-mentioned association level and stores the generated association information in the user association level DB 5200F.

In this way, the user association level determining unit 5206 determines the association levels between the users of the plurality of mobile terminals 4 based on the vehicles 3 which are used by the users of the plurality of mobile terminals 4 and which are identified by the used vehicle identifying unit 5205. For example, when the same vehicle is identified as the vehicles 3 which are used by the users of two or more mobile terminals 4, the user association level determining unit 5206 can determine that the two or more users have an association of boarding the vehicle 3 together or borrowing or lending the vehicle 3. Accordingly, the movement information management system 1 or the advertisement management system 2 which will be described later can deliver advertisement information or recommendation information to mobile terminals of users in consideration of common tastes of the users in a situation in which two or more users having an association are located at the same position, or the like. Accordingly, since advertisement information or recommendation information in consideration of common tastes can be delivered to a group of users having an association therebetween such that they are likely to act together, it is possible to improve the effects of delivery of advertisement information or recommendation information.

When the same vehicle is identified as vehicles 3 which are used by users of two or more mobile terminals 4 by the used vehicle identifying unit 5205, the user association level determining unit 5206 determines the association level between the two or more users depending on the boarding frequencies of the two or more users in the same vehicle. For example, when the same vehicle is identified as vehicles 3 which are used by two users and the difference in the boarding frequency in the same vehicle between the two users is relatively small, the user association level determining unit 5206 can determine that the two users frequently board a vehicle together and the association level therebetween is high. When the difference in the boarding frequency in the same vehicle between the two users is relatively large, the user association level determining unit 5206 can determine that the two users do not frequently board a vehicle together and the association level therebetween is low. Accordingly, when the association level between two or more users in a vehicle 3 is relatively high such as family members, friends, or the like, it is possible to deliver advertisement information or recommendation information to the mobile terminals of the users in consideration of common tastes of the users. Accordingly, since advertisement information or recommendation information in consideration of common tastes can be delivered to a group of users having relatively strong association therebetween as a target, it is possible to further improve the effects of delivery of advertisement information or recommendation information.

The boarding ascertaining unit 5207 ascertains whether a user of a mobile terminal 4 is actually in a vehicle 3 which is used by the user of the mobile terminal 4 based on conditional relationships between a plurality of mobile terminals 4 and a plurality of vehicles 3 which are stored in the used vehicle DB 5200E. For example, the boarding ascertaining unit 5207 may compare current terminal movement information of a plurality of mobile terminals 4 with current vehicle movement information of vehicles 3 correlated with the plurality of mobile terminals 4 in the used vehicle DB 5200E in real time. Accordingly, the boarding ascertaining unit 5207 has only to monitor only the vehicle movement history of the vehicle 3 which is identified in advance as being used by the user of the mobile terminal 4 in the used vehicle DB 5200E and can ascertain whether the user of the mobile terminal 4 is in the vehicle 3 in a practical processing time. Details of the process which is performed by the boarding ascertaining unit 5207 will be described later.

In this way, in the used vehicle DB 5200E, users of a plurality of mobile terminals 4 and vehicles 3 which are used by the users of the plurality of mobile terminals 4 and which are identified by the used vehicle identifying unit 5205 are stored in correlation with each other. The boarding ascertaining unit 5207 ascertains whether a user of a mobile terminal 4 is in the corresponding vehicle 3 based on current position information of the mobile terminal 4 and current position information of the vehicle 3 which is stored in the used vehicle DB 5200E in correlation with the user of the mobile terminal 4. Accordingly, the boarding ascertaining unit 5207 can ascertain whether the user of the mobile terminal 4 is in the vehicle 3 in real time by monitoring the current position information of the plurality of mobile terminals 4 and the current position information of the vehicles 3 stored in correlation with the users of the plurality of mobile terminals 4. Even when users of two or more mobile terminals 4 are moving in a vehicle 3 together, it is difficult to ascertain whether the users of the two or more mobile terminals 4 are moving in the vehicle 3 together using only the terminal movement information of the mobile terminals 4 depending on the accuracy of the position information or an acquisition time of the terminal movement information. On the other hand, in this embodiment, when users of two or more mobile terminals 4 are correlated with the same vehicle 3, it is possible to relatively accurately ascertain whether the users of the two or more mobile terminals 4 are in the vehicle together using the vehicle 3.

The user onboard movement tracking unit 5208 tracks a movement route from a departure point to a destination of a vehicle 3 when the boarding ascertaining unit 5207 ascertains that a user of a mobile terminal 4 is in the vehicle 3. The user onboard movement tracking unit 5208 stores information on the tracked movement route (onboard movement tracking information) in the tracking information DB 5200G in correlation with the user in the vehicle or the mobile terminal 4 of the user and the boarded vehicle 3. The onboard movement tracking information includes point of interest (POI) information and area information corresponding to the departure point and the destination or information of road links corresponding to the movement route from the departure point to the destination, that is, link IDs. Details of the process which is performed by the user onboard movement tracking unit 5208 will be described later.

When it is ascertained that users of two or more mobile terminals 4 are in a vehicle 3, the user onboard movement tracking unit 5208 stores the onboard movement tracking information at that time in the tracking information DB 5200G in correlation with the two or more users in the vehicle or the mobile terminals 4 of the two or more users and the boarded vehicle 3.

The utterance data storage processing unit 5209 (an example of an utterance contents acquiring unit) acquires text data (utterance data) corresponding to contents of utterance of occupants in a plurality of vehicles 3 based on voice data in the vehicles which is received from the plurality of vehicles 3 by the communication processing unit 5201. The utterance data storage processing unit 5209 adds predetermined additional information to the acquired utterance data and then stores the resultant utterance data in the storage unit 5200 (the utterance data DB 5200H). The additional information added to the utterance data includes link IDs added to original voice data and trip IDs corresponding to trip information of the vehicles 3 when the original voice data has been acquired. The additional information added to the utterance data also includes identification information (terminal IDs) of the mobile terminals 4 of the users which are ascertained to be in the vehicles 3 when the original voice data has been acquired by the boarding ascertaining unit 5207. Details thereof will be described later.

The feature word extracting unit 5210 extracts a word (a feature word) that characterizes contents of utterance from utterance data stored in the utterance data DB 5200H. The feature word extracting unit 5210 can extract a feature word from utterance data using various existing methods. Details thereof will be described later.

The utterance-time information acquiring unit 5211 acquires information related to a vehicle 3 (for example, information on a position of the vehicle 3, information on a destination of the vehicle 3, and information on a user of a mobile terminal 4 in the vehicle 3) when the feature word extracted by the feature word extracting unit 5210 is uttered. For example, the utterance-time information acquiring unit 5211 may acquire a link ID which is added to utterance data as original data of the extracted feature word as the information on the position of the vehicle 3 when the feature word is uttered. For example, the utterance-time information acquiring unit 5211 may acquire a trip ID which is added to the utterance data as original data of the extracted feature word as the information on the destination of the vehicle 3 when the feature word is uttered. The utterance-time information acquiring unit 5211 may acquire a terminal ID which is added to the utterance data as original data of the extracted feature word as the information on the user of the mobile terminal 4 in the vehicle 3 when the feature word is uttered.

The utterance number counting unit 5212 counts the number of times of utterance for each of a plurality of different words extracted as the feature word by the feature word extracting unit 5210 for each of position indicators corresponding to the position of the vehicle 3 includes, for example, a road link corresponding to the position of the vehicle 3, a crossing (specifically, a nearby crossing in a traveling direction) corresponding to the position of the vehicle 3, and an area corresponding to the position of the vehicle 3. In this embodiment, the utterance number counting unit 5212 counts the number of times of utterance for each of a plurality of different words extracted as the feature words from contents of utterance (utterance data) in a plurality of vehicles 3 by the feature word extracting unit 5210 for each road link (link ID) corresponding to the positions of the vehicles 3. Accordingly, it is possible to ascertain feature words about which occupants in the vehicles 3 passing through each road link talk, that is, feature words of which the number of times of utterance is relatively high. Accordingly, for example, it is assumed that there is a high likelihood that a word about which occupants in the vehicle 3 passing through a position corresponding to a certain road link relatively frequently will be associated with a purpose of actions of the occupants in the vehicle 3, and thus purposes of actions of users passing through the road link can be estimated based on the counting results. Details thereof will be described later.

The utterance number counting unit 5212 counts the number of times of utterance for each of a plurality of different words extracted as the feature word by the feature word extracting unit 5210 for each of departure indicators and each of destination indicators corresponding to a departure point and a destination of the vehicle 3. The departure indicator and the destination indicator corresponding to a departure point and a destination of a vehicle 3 can include, for example, POIs or areas corresponding to the departure point and the destination of the vehicle 3. In this embodiment, the utterance number counting unit 5212 counts the number of times of utterance for each of a plurality of different words extracted as the feature words from contents of utterance (utterance data) in a plurality of vehicles 3 by the feature word extracting unit 5210 for each POI corresponding to the departure points of the vehicles 3. In addition, the utterance number counting unit 5212 counts the number of times of utterance for each of a plurality of different words extracted as the feature words from contents of utterance (utterance data) in a plurality of vehicles 3 by the feature word extracting unit 5210 for each POI corresponding to the destinations of the vehicles 3. Accordingly, it is possible to ascertain feature words about which occupants in the vehicles 3 with each POI as the destination talk, that is, feature words of which the number of times of utterance is relatively high. Accordingly, for example, it is assumed that there is a high likelihood that a word about which occupants in the vehicle 3 with a POI as the destination talk relatively frequently will be associated with a purpose of actions of the occupants in the vehicle 3, and thus a purpose of actions of occupants of the vehicle 3 with the POI as the destination can be estimated based on the counting results. Details thereof will be described later.

The utterance number counting unit 5212 may count the number of times of utterance for each of a plurality of different words extracted as the feature word from contents of utterance (utterance data) after a predetermined time point (for example, after a time point three months ago) by the feature word extracting unit 5210. That is, the utterance number counting unit 5212 may count the number of times of utterance of only the feature words extracted by the feature word extracting unit 5210 from the utterance data after a predetermined time point which is appropriately set. Accordingly, by appropriately setting the predetermined time point, it is possible to more appropriately estimate a purpose of actions of users in consideration of a position indicator (a road link) corresponding to the position of the vehicle 3 or a latest situation (for example, opening of a new establishment or opening of a new road) associated with a destination indicator (a POI) corresponding to the destination of the vehicle 3.

The feature word correlating unit 5213 stores the words extracted as the feature word by the feature word extracting unit 5210 in the storage unit 5200 in correlation with the vehicle 3 in which the feature words are uttered and users in the vehicle 3 or mobile terminals 4 of the users. For example, the feature word correlating unit 5213 may store a word extracted as a feature word from utterance data of a vehicle 3 by the feature word extracting unit 5210 in the storage unit 5200 as additional relation information for correlating the vehicle 3 and the users in the vehicle 3 or the mobile terminals 4 of the users in the used vehicle DB 5200E. When a word extracted as a feature word from utterance data of a vehicle 3 by the feature word extracting unit 5210 is already registered as relation information (additional relation information) for correlating the vehicle 3 and the users in the vehicle 3 or the mobile terminals 4 of the users in the used vehicle DB 5200E, the feature word correlating unit 5213 may count the number of times of extraction (the number of times of utterance) of the word and store the counted number in the storage unit 5200 as additional relation information. Accordingly, it is assumed that there is a high likelihood that a feature word which is uttered by a user in a vehicle 3, particularly, a feature word with a high utterance frequency, will be associated with a purpose of actions of the user moving in the vehicle 3, and thus the feature word uttered by the user of the mobile terminal 4 in the vehicle 3 and the utterance frequency thereof can be ascertained. Accordingly, it is possible to estimate a purpose of actions of a specific user moving in a vehicle 3 using the additional relation information in the used vehicle DB 5200E.

The current position information acquiring unit 5214 (an example of a current information acquiring unit) acquires information on a current position of a vehicle 3 from the probe information DB 5200B in response to a predetermined inquiry from the advertisement management server 6.

[Details of Operation of Movement Information Management System]

A specific operation of the movement information management system 1 will be described below with reference to FIGS. 7 to 13.

Figure 7:
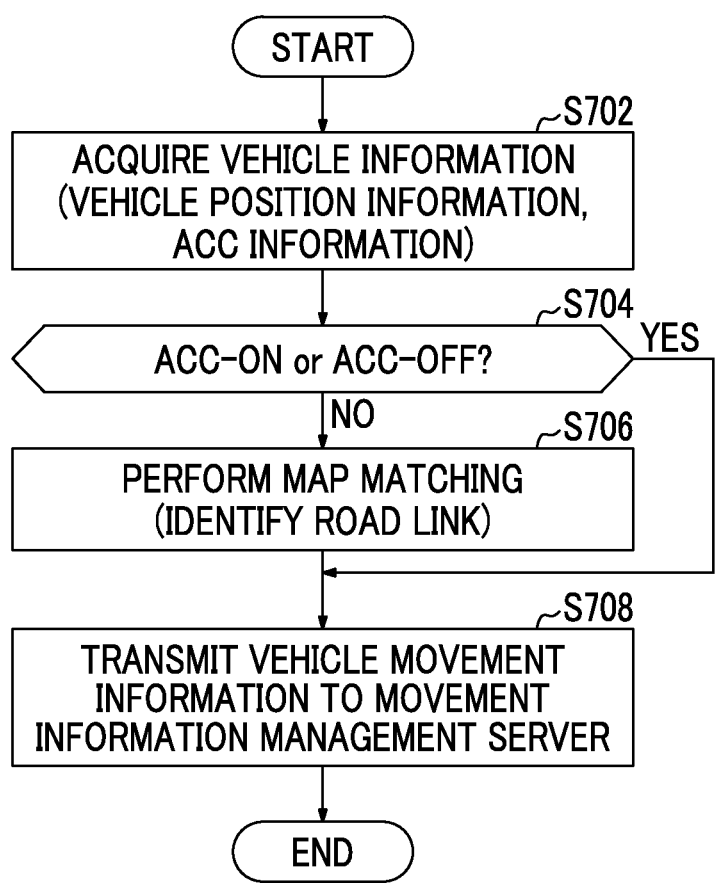
FIG. 7 is a flowchart schematically illustrating an example of a processing routine which is performed by the vehicle (the ECU)

FIG. 7 is a flowchart schematically illustrating an example of a processing routine which is performed by the ECU 32 of a vehicle 3 according to this embodiment. The processing routine of the flowchart is repeatedly performed periodically (for example, every detection period in which vehicle position information of the vehicle 3 is detected by the GPS module 33), for example, until a predetermined period with ACC-OFF as a starting point elapses from ACC-ON of the vehicle 3.

In Step S702, the vehicle information acquiring unit 321 acquires position information of the vehicle 3 and a signal related to an ON/OFF state of the ACC switch 34 which are respectively input from the GPS module 33 and the ACC switch 34.

In Step S704, the ECU 32 determines whether the ACC switch 34 has been turned on or off. For example, when the processing routine of the flowchart is started in response to ACC-ON as described above and this is a first processing routine after the flowchart has been started, the ECU 32 may determine that the ACC switch has been turned on. When the processing routine of the flowchart is performed even in a parking lot of the vehicle 3 and the state signal from the ACC switch 34 has been switched from the OFF signal to the ON signal, the ECU 32 may determine that the ACC switch 34 has been turned on. When the state signal from the ACC switch 34 has been switched from the ON signal to the OFF signal, the ECU 32 may determine that the ACC switch 34 has been turned off. The ECU 32 performs Step S706 when the ACC switch 34 has not been turned on or off, and performs Step S708 when the ACC switch 34 has been turned on or off.

In Step S706, the map matching unit 322 identifies a road link (a link ID) on which the vehicle 3 is currently located based on the current position information of the vehicle 3 acquired by the vehicle information acquiring unit 321.

In Step S708, the vehicle movement information transmitting unit 323 transmits vehicle movement information including the position information of the vehicle 3, time information corresponding to the position information, and ACC-ON/OFF information or the link ID of a road link to the movement information management server 5 via the DCM 31, and ends this processing routine. Accordingly, the movement information management server 5 can ascertain a specific road link on which the vehicle 3 is located or starting (ACC-ON) and stopping (ACC-OFF) of the vehicle 3 in addition to the position information of the vehicle 3 and the time information corresponding to the position information by simply checking the vehicle movement information.

Figure 8:
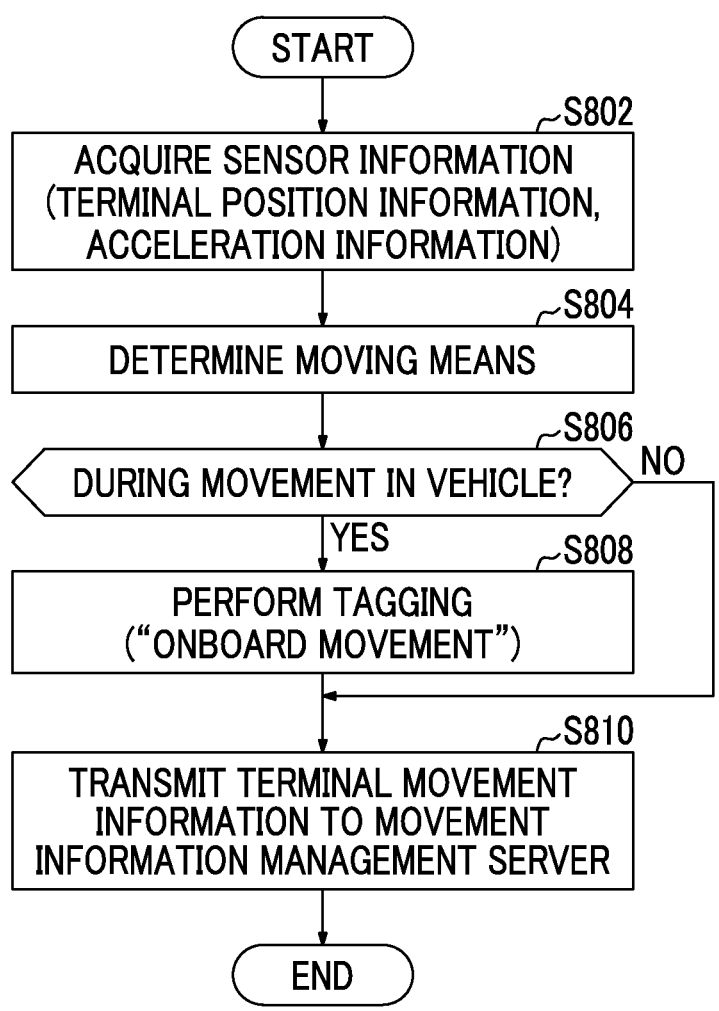
FIG. 8 is a flowchart schematically illustrating an example of a processing routine which is performed by the mobile terminal (the processor)

FIG. 8 is a flowchart schematically illustrating an example of a processing routine which is performed by the processor 42 of a mobile terminal 4 according to this embodiment. The processing routine of the flowchart is repeatedly performed periodically (for example, every detection period of the GPS module 43), for example, in a state in which the mobile terminal 4 is powered on. The processing routine of the flowchart may be performed when the mobile terminal 4 is powered on and position information of the mobile terminal 4 with relatively high accuracy can be acquired by the GPS module 43, that is, only when GPS signals can be received by the GPS module 43.

In Step S802, the sensor information acquiring unit 423 acquires latest position information and acceleration information of the mobile terminal 4 which are input from the GPS module 43 and the acceleration sensor 44.

In Step S804, the moving means determining unit 424 determines whether the user of the mobile terminal 4 is moving in a vehicle as moving means or is moving by other moving means based on the acceleration information of the mobile terminal 4 acquired by the sensor information acquiring unit 423.

In Step S806, the moving means determining unit 424 performs Step S808 when the user of the mobile terminal 4 is a vehicle as moving means, and skips Step S808 and performs Step S810 when the user of the mobile terminal 4 is moving by moving means other than a vehicle except public transportation.

In Step S808, the terminal movement information transmitting unit 425 attaches an onboard movement tag indicating that the user of the mobile terminal 4 is moving in a vehicle 3 except public transportation to the terminal movement information.

In Step S810, the terminal movement information transmitting unit 425 transmits the terminal movement information including the position information of the mobile terminal 4 and time information corresponding to the position information to the movement information management server via the communication processing unit 421 and then ends this processing routine. Accordingly, the movement information management server 5 can acquire the terminal movement information with which a case in which the mobile terminal 4 is moving in a vehicle except public transportation and a case in which the mobile terminal 4 is moving by moving means other than a vehicle except public transportation can be discriminated.

Figure 9:
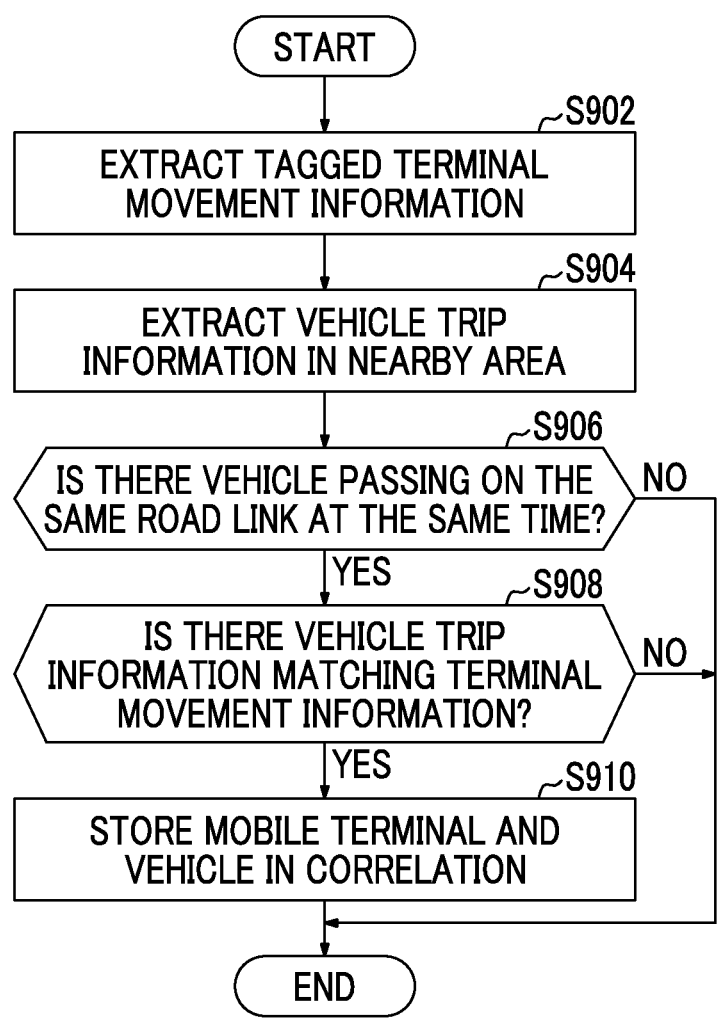
FIG. 9 is a flowchart schematically illustrating an example of a used vehicle identifying process which is performed by the movement information management server (a processor)

FIG. 9 is a flowchart schematically illustrating an example of a processing routine (a used vehicle identifying process) of identifying a vehicle 3 which is used by each user of a plurality of mobile terminals 4 which is performed by the processor 52 of the movement information management server 5 according to this embodiment. The processing routine of the flowchart may be performed on updated vehicle movement histories and terminal movement histories in real time in response to updating of the vehicle movement history DB 5200C and the terminal movement history DB 5200D as described above. The processing routine of the flowchart may be performed on non-processed vehicle movement histories and terminal movement histories which are updated in one period of the flowchart in the vehicle movement history DB 5200C and the terminal movement history DB 5200D every predetermined period as described above.

In Step S902, the boarded vehicle extracting unit 5204 extracts a data group of terminal movement information with the onboard movement tag among terminal movement histories (a data group of terminal movement information) to be processed in the terminal movement history DB 5200D. Accordingly, since only the terminal movement information of the mobile terminals 4 carried by users who are much likely to be in one of a plurality of vehicles 3 among the terminal movement histories to be processed is processed through the processes of Steps S904 to S910, it is possible to improve processing efficiency as a whole and to shorten the time to completion of the processing.

Hereinafter, when there are a plurality of mobile terminals 4 corresponding to the data group of terminal movement information extracted in Step S902, the processes of Steps S904 to S910 are performed on each mobile terminal 4.

In Step S904, the boarded vehicle extracting unit 5204 extracts trip information of a vehicle 3 passing by a nearby area (for example, within 1 km) of the position information of the data group in a time zone of the time information included in the extracted time-series data group of the terminal movement information of the mobile terminal 4 from the vehicle movement history DB 5200C.

In Step S906, the boarded vehicle extracting unit 5204 determines whether there is a vehicle 3 passing by the same road link at the same time as the mobile terminal 4 based on the time-series data group of the terminal movement information and the extracted trip information. The boarded vehicle extracting unit 5204 performs Step S908 when there is a vehicle 3 passing by the same road link at the same time as the mobile terminal 4, and ends this processing routine when there is no vehicle 3 passing by the same road link as the same time as the mobile terminal 4.

In Step S908, the boarded vehicle extracting unit 5204 specifically, determines whether there is trip information of the vehicle 3 matching the time-series data group of the terminal movement information. For example, the boarded vehicle extracting unit 5204 searches for trip information of the vehicle 3 matching the time-series data group of the terminal movement information of the mobile terminal 4 based on whether the staying record condition and the synchronous movement condition are satisfied as described above. The boarded vehicle extracting unit 5204 determines that the user of the mobile terminal 4 is in the vehicle 3 corresponding to the trip information and performs Step S910 when there is there is trip information of the vehicle 3 matching the time-series data group of the terminal movement information, and ends this processing routine when there is not trip information of the vehicle 3 matching the time-series data group of the terminal movement information.

In Step S910, the used vehicle identifying unit 5205 stores a mobile terminal 4 (or a user thereof) in correlation with a vehicle 3 corresponding to trip information matching a time-series data group of terminal movement information of the mobile terminal 4 in the used vehicle DB 5200E, and ends this processing routine. Accordingly, the used vehicle identifying unit 5205 can store the vehicle 3 which has been boarded by the user of the mobile terminal 4 and which is extracted by the boarded vehicle extracting unit 5204 in a state in which the vehicle 3 is identified as being used by the user of the mobile terminal 4 or in a temporarily identified state.

Figure 10:
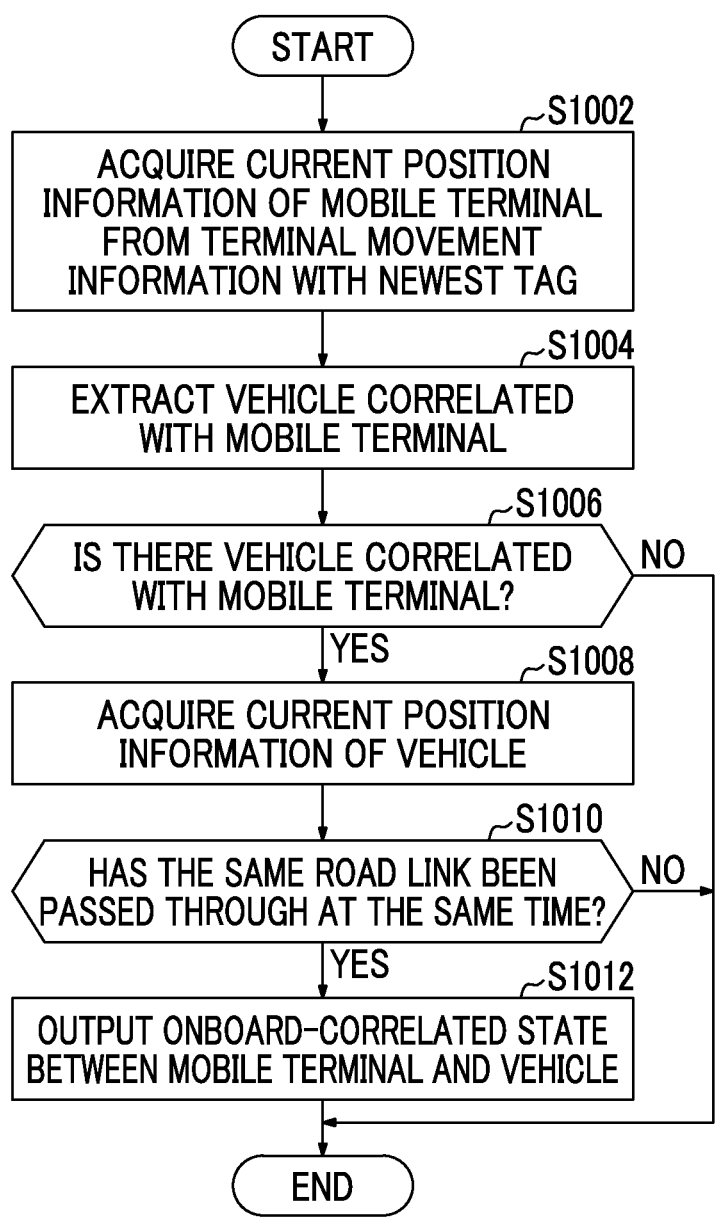
FIG. 10 is a flowchart schematically illustrating an example of a boarding ascertaining process which is performed by the movement information management server (the processor)

FIG. 10 is a flowchart schematically illustrating an example of a processing routine of ascertaining boarding which is performed by the processor 52 of the movement information management server 5 according to this embodiment. For example, the processing routine of the flowchart is repeatedly performed at predetermined time intervals when the movement information management server 5 (the processor 52) is operating.

In Step S1002, the boarding ascertaining unit 5207 acquires current position information and corresponding time information of a mobile terminal 4 corresponding to terminal movement information with an onboard movement tag from the terminal movement information with the onboard movement tag among latest terminal movement information in the terminal movement history DB 5200D.

Hereinafter, when there are a plurality of mobile terminals 4 corresponding to the terminal movement information with the onboard movement tag, the processes of Steps S1004 to S1012 are performed on each mobile terminal 4.

In Step S1004, the boarding ascertaining unit 5207 extracts a vehicle 3 stored in correlation with the mobile terminal 4 corresponding to the acquired terminal movement information in the used vehicle DB 5200E, that is, a vehicle 3 which is used by a user of the mobile terminal 4.

In Step S1006, the boarding ascertaining unit 5207 determines whether the vehicle 3 correlated with the mobile terminal 4 has been able to be extracted in Step S1004, that is, the vehicle 3 which is used by the user of the mobile terminal 4 is stored in the used vehicle DB 5200E. The boarding ascertaining unit 5207 performs Step S1008 when there is a vehicle 3 correlated with the mobile terminal 4, and ends this processing routine otherwise.

In Step S1008, the boarding ascertaining unit 5207 acquires current position information of the vehicle 3 and corresponding time information from the extracted latest vehicle movement information of the vehicle 3 stored in the probe information DB 5200B or the vehicle movement history DB 5200C.

In Step S1010, the boarding ascertaining unit 5207 determines whether the mobile terminal 4 and the vehicle 3 are passing through the same road link at the same time based on the current position information of the mobile terminal 4 and the vehicle 3 and the map information DB 5200A. The boarding ascertaining unit 5207 determines whether the mobile terminal 4 and the vehicle 3 are passing through the same road link at the same time, for example, in comprehensive consideration of a difference between the current position information of the mobile terminal 4 and the current position information of the vehicle 3, a difference between the time information corresponding to the current position information of the mobile terminal 4 and the time information corresponding to the current position information of the vehicle 3, and the determination results of this step in the previous flowchart. The boarding ascertaining unit 5207 performs Step S1012 when it is determined that the mobile terminal 4 and the vehicle 3 are passing through the same road link as the same time, and ends this processing routine otherwise.

In Step S1012, the boarding ascertaining unit 5207 outputs an onboard-correlated state of the mobile terminal 4 and the vehicle 3 which indicates that the user of the mobile terminal 4 is in the vehicle 3 and ends this processing routine. Accordingly, it is possible to determine whether the mobile terminal 4 is in the vehicle 3 which is ascertained to be used by the user of the mobile terminal 4 based on whether the mobile terminal is onboard-correlated with the vehicle 3.

Figure 11:
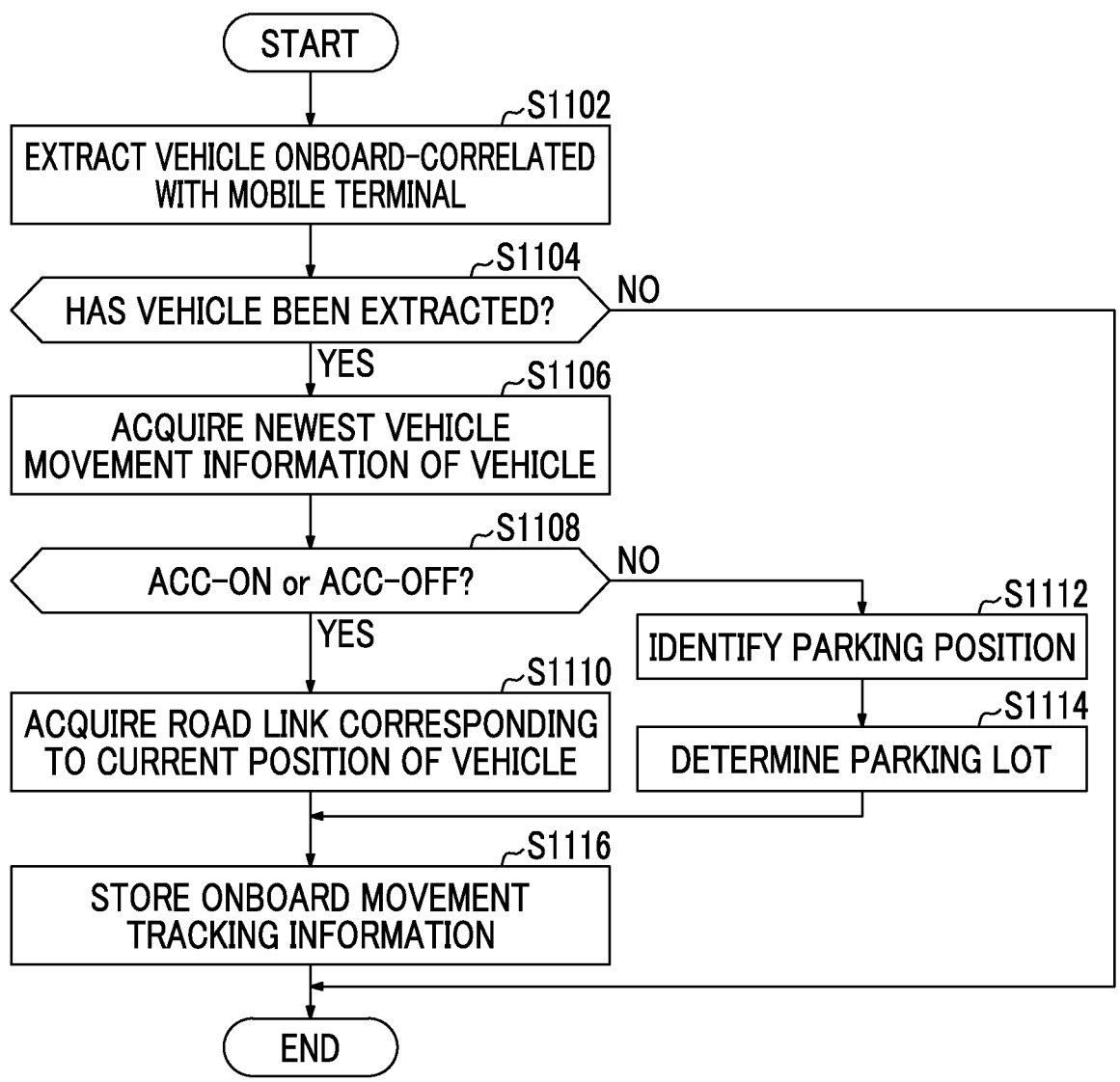
FIG. 11 is a flowchart schematically illustrating an example of an onboard movement tracking process which is performed by the movement information management server (the processor)

FIG. 11 is a flowchart schematically illustrating an example of a process of tracking a movement route of a vehicle 3 in which a user of a mobile terminal 4 is (a user onboard movement tracking process), which is performed by the processor 52 of the movement information management server 5 according to this embodiment. The process routine of this flowchart is repeatedly performed at predetermined time intervals, for example, when the movement information management server 5 (the processor 52) is operating. The processing routine of this flowchart is performed on each of a plurality of mobile terminals 4.

In Step S1102, the user onboard movement tracking unit 5208 extracts a vehicle 3 onboard-correlated with a mobile terminal 4 among vehicles 3 stored in correlation with the mobile terminal 4 in the used vehicle DB 5200E.

In Step S1104, the user onboard movement tracking unit 5208 determines whether a vehicle 3 onboard-correlated with the mobile terminal 4 has been extracted. The user onboard movement tracking unit 5208 performs Step S1106 when the vehicle 3 onboard-correlated with the mobile terminal 4 has been extracted, and ends this processing routine when the vehicle 3 onboard-correlated with the mobile terminal 4 has not been extracted.

In Step S1106, the user onboard movement tracking unit 5208 acquires latest vehicle movement information of the extracted vehicle 3 which is stored in the probe information DB 5200B or the vehicle movement history DB 5200C.

In Step S1108, the user onboard movement tracking unit 5208 determines whether the vehicle 3 extracted in Step S1104 is in ACC-ON or ACC-OFF based on the acquired vehicle movement information. That is, the user onboard movement tracking unit 5208 determines whether the acquired vehicle movement information includes ACC-ON information or ACC-OFF information. The user onboard movement tracking unit 5208 performs Step S1110 when the acquired vehicle movement information includes neither of ACC-ON information and ACC-OFF information, and performs Step S1112 when the acquired vehicle movement information includes ACC-ON information or ACC OFF information.

In Step S1110, the user onboard movement tracking unit 5208 acquires information on a road link corresponding to a current position of the vehicle 3, that is, a link ID, from the vehicle movement information.

On the other hand, in Step S1112, the user onboard movement tracking unit 5208 identifies a parking position of the vehicle 3 based on the vehicle movement information. That is, the user onboard movement tracking unit 5208 identifies a POI (an establishment or a store) corresponding to the place in which the vehicle 3 is parked, for example, a candidate for a POI (POI candidate) which is supposed for the user of the mobile terminal 4 to visit from the parked vehicle 3, based on the position information of the vehicle 3 included in the vehicle movement information and the map information DB 5200A.

In Step S1114, the user onboard movement tracking unit 5208 determines whether the identified parking position of the vehicle 3 is a parking lot of the candidate POI. For example, the user onboard movement tracking unit 5208 may determine whether the parking position of the vehicle 3 is the parking lot of the candidate POI by determining whether the position information of the vehicle 3 is included in a polygonal range of the parking lot of the candidate POI included in the map information DB 5200A. For example, the user onboard movement tracking unit 5208 may determine whether the parking position of the vehicle 3 is the parking lot of the candidate POI by determining whether the vehicle 3 departs from a road link to the outside of the road link in the vicinity of an entrance or exit of the parking lot of the candidate POI based on the vehicle movement information just before the vehicle 3 is switched to ACC-OFF and the map information DB 5200A. For example, the user onboard movement tracking unit 5208 may determine whether the parking position of the vehicle 3 is the parking lot of the candidate POI by determining whether the vehicle 3 has returned from the outside of the road link to the road link in the vicinity of an entrance or exit of the parking lot of the candidate POI based on the vehicle movement information just after the vehicle 3 is switched to ACC-ON and the map information DB 5200A.

In Step S1116, the user onboard movement tracking unit 5208 stores the information on the road link (that is, the link ID) acquired in Step S1110 or onboard movement tracking information including the parking position of the vehicle 3 (the information on the candidate POI or the like) identified in Step S1112 and the determination result of Step S1114 in the tracking information DB 5200G in correlation with the mobile terminal 4 and the vehicle 3. Then, this processing routine ends. Accordingly, it is possible to check information on a movement route or a departure point and a destination when a user of a mobile terminal 4 moves in a vehicle 3 (such as candidate POI information or determination results of whether the vehicle is parked in a parking lot of a candidate POI) later. That is, by checking a movement route along which a user of a mobile terminal 4 moves and a destination which the user visits later, for example, it is possible to identify a taste of the user of the mobile terminal 4 or the like and use the identified taste for delivery of a target advertisement, selection of an installation position of a digital signage, or the like. As will be described later, it is possible to identify visit records of a real store (a real store for selling a target product of the advertisement or the like) as a guidance destination of an advertisement or the like.

Figure 12:
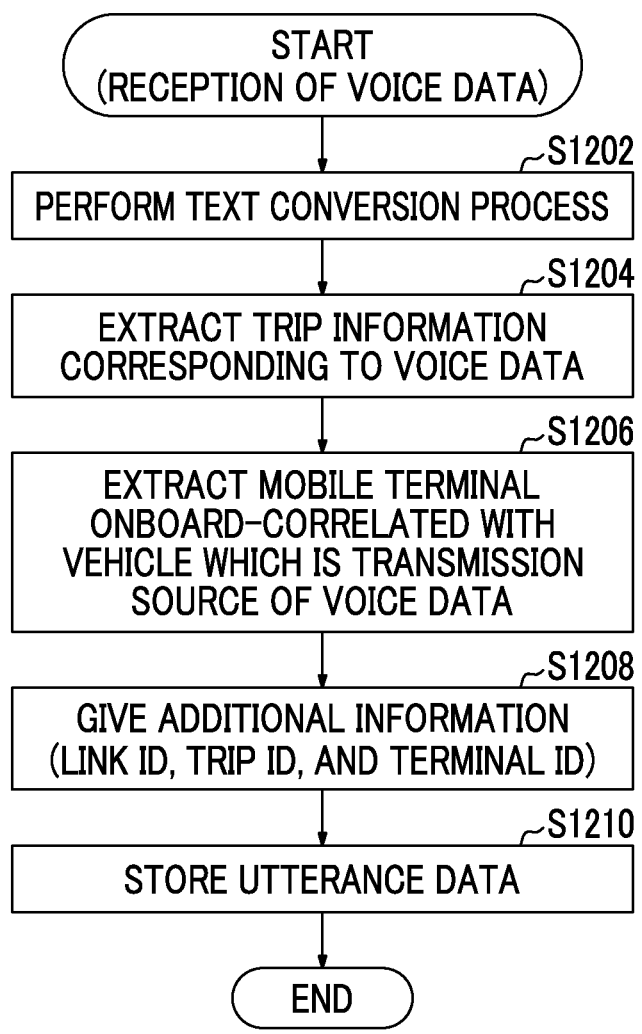
FIG. 12 is a flowchart schematically illustrating an example of an utterance data storing process which is performed by the movement information management server (the processor)

FIG. 12 is a flowchart schematically illustrating an example of a process of storing utterance data which is performed by the processor 52 of the movement information management server 5. The processing routine of this flowchart may be performed, for example, whenever voice data is received from the vehicle 3 by the communication processing unit 5201.

In Step S1202, the utterance data storage processing unit 5209 converts voice data received from a vehicle 3 by the communication processing unit 5201 into text data (utterance data) by performing an existing voice recognition process thereon.

In Step S1204, the utterance data storage processing unit 5209 searches the vehicle movement history DB 5200C for trip information corresponding to the voice data, that is, trip information of the vehicle 3 when the voice data is acquired.

In Step S1206, the utterance data storage processing unit 5209 extracts a mobile terminal 4 of a user in the vehicle 3 as a transmission source of the voice data, that is, a mobile terminal 4 onboard-correlated with the vehicle 3, among a plurality of mobile terminals 4 based on the used vehicle DB 5200E.

In Step S1208, the utterance data storage processing unit 5209 adds additional information (a link ID added to original data, a trip ID of the trip information extracted in Step S1204, and a terminal ID of the mobile terminal 4 extracted in Step S1206) to the utterance data as described above.

When a mobile terminal 4 onboard-correlated with the vehicle 3 as a transmission source of the voice data has not been extracted in Step S1206, a terminal ID is omitted from the additional information added in this step.

In Step S1210, the utterance data storage processing unit 5209 stores the utterance data to which the additional information has been added in the utterance data DB 5200H and ends this processing routine.

Figure 13:
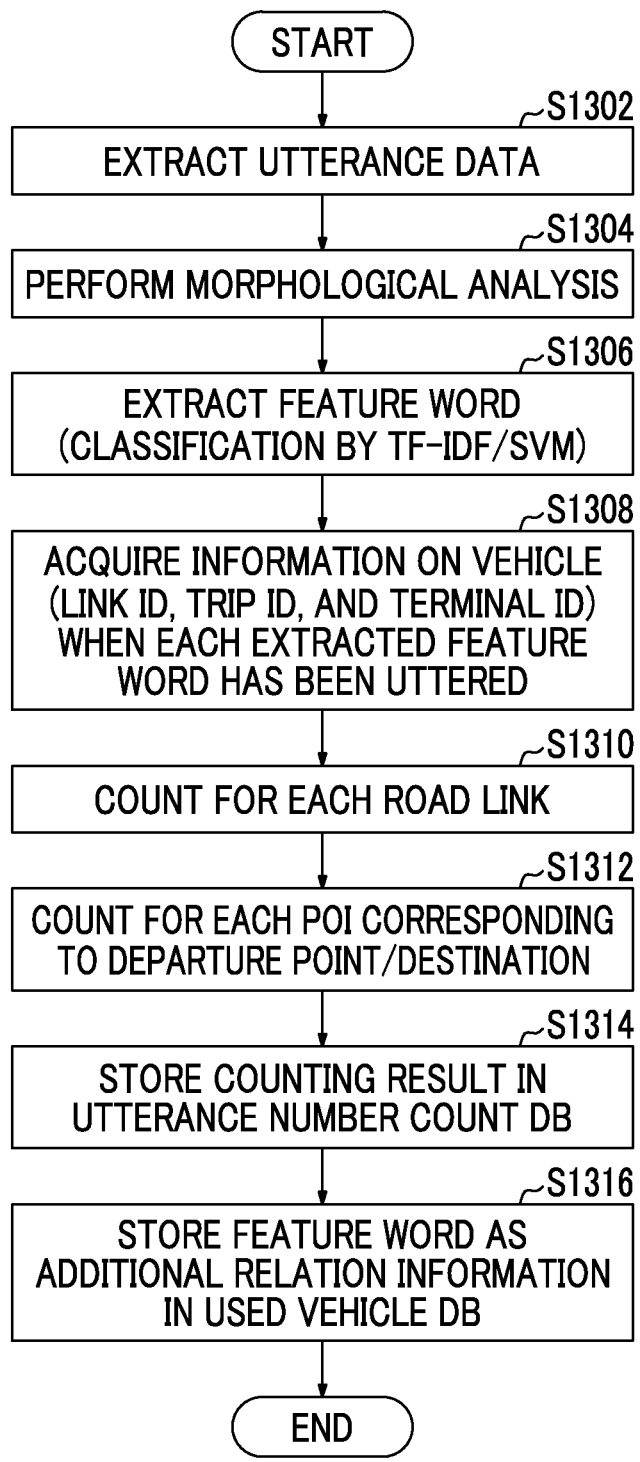
FIG. 13 is a flowchart schematically illustrating an example of an utterance data analyzing process which is performed by the movement information management server (the processor)

FIG. 13 is a flowchart schematically illustrating an example of an utterance data analyzing process which is performed by the processor 52 of the movement information management server 5. The processing routine of this flowchart may be performed in real time on utterance data to be updated, for example, in response to updating of the utterance data DB 5200H. The processing routine of this flowchart may be performed on non-processed utterance data which is updated in one period for each predetermined period.

In Step S1302, the feature word extracting unit 5210 extracts target utterance data from the utterance data DB 5200H.

In Step S1304, the feature word extracting unit 5210 performs existing morphological analysis and decomposes the utterance data into character strings as units having meanings based on a keyword dictionary (not illustrated) stored in advance in the storage unit 5200.

In Step S1306, the feature word extracting unit 5210 extracts a feature word which is a word characterizing contents of utterance based on the character strings decomposed through the morphological analysis. For example, the feature word extracting unit 5210 may extract a feature word from the decomposed character strings or character strings corresponding to compound words into which the decomposed character strings are connected using term frequency (TF)-inverse document frequency (IDF) in which importance levels of words in a document are digitized and handled. For example, the feature word extracting unit 5210 calculates a plurality of features (feature vectors) based on prescribed characteristics of feature words (for example, easiness of appearance as a subjective or an objective) for each of the character strings decomposed through the morphological analysis or compound words into which the decomposed character strings are connected. The feature word extracting unit 5210 may extract a feature word using a support vector machine (SVM) which is a discriminator that classifies feature words and non-feature words which are not feature words and which is generated in advance by machine learning.

In Step S1308, the utterance-time information acquiring unit 5211 acquires information on a vehicle 3 when each extracted feature word is uttered. Specifically, the utterance-time information acquiring unit 5211 acquires a link ID corresponding to a position of a vehicle 3 when each feature word is uttered, a trip ID corresponding to the trip information of the vehicle 3, and a terminal ID of a mobile terminal 4 of a user in the vehicle 3 as described above.

In Step S1310, the utterance number counting unit 5212 counts the number of times of utterance for each of a plurality of different words which are extracted as a feature word for each road link based on the link ID corresponding to each feature word acquired by the utterance-time information acquiring unit 5211. When previous counting results are already stored in the utterance number count DB 5200I, the utterance number counting unit 5212 may calculate the counting results as a whole by adding the numbers of times of utterance of different words extracted through this processing routine to the previous counting results. When only feature words extracted from contents of utterance (utterance data) after a predetermined time point are to be counted as described above, the utterance number counting unit 5212 has only to subtract the number of times of utterance corresponding to the feature words extracted from contents of utterance before the predetermined time point from the counting results stored already in the utterance number count DB 5200I. The same is true of a counting process for POIs corresponding to a departure point and a destination in next steps.

In Step S1312, the utterance number counting unit 5212 counts the number of times of utterance for each of a plurality of different words extracted as a feature word for each of the POIs corresponding to the departure point and the destination based on the trip information in the vehicle movement history DB 5200C corresponding to the trip ID acquired by the utterance-time information acquiring unit 5211.

In Step S1314, the utterance number counting unit 5212 stores the counting results of Steps S1310 and S1312 in the utterance number count DB 5200I.

In Step S1316, the feature word correlating unit 5213 stores the extracted feature words as additional relation information in the used vehicle DB 5200E based on the terminal ID acquired by the utterance-time information acquiring unit 5211 as described above and ends this processing routine. Specifically, the feature word correlating unit 5213 stores the feature words and the numbers of times of utterance thereof as additional relation information for correlating a vehicle 3 in which each feature word has been uttered with a user in the vehicle 3 or a mobile terminal 4 of the user in the used vehicle DB 5200E.

[Configuration of Advertisement Management System]

The configuration of the advertisement management system 2 according to this embodiment will be described below with reference to FIG. 14 in addition to FIGS. 1 to 4.

Figure 14:
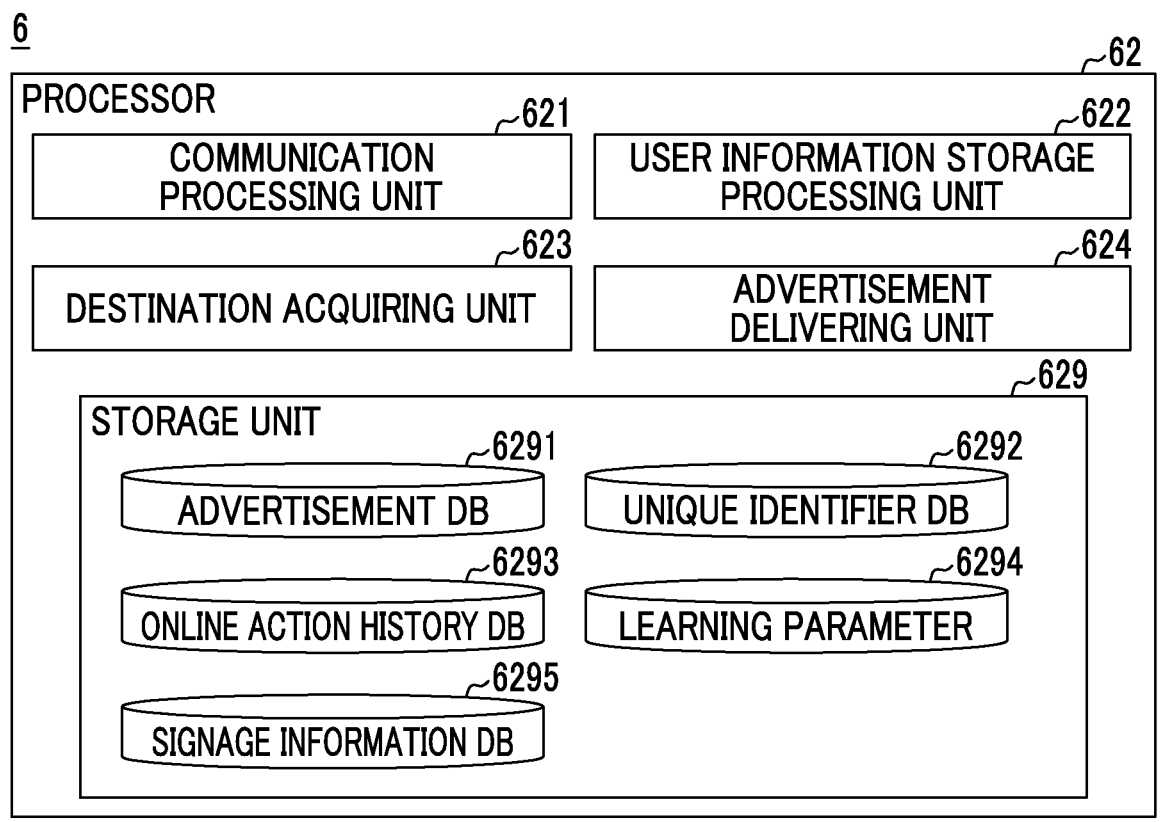
FIG. 14 is a diagram schematically illustrating an example of an utterance number counting result (an utterance number count DB) in the movement information management server (the processor)

FIG. 14 is a functional block diagram schematically illustrating an example of a functional configuration of the advertisement management server 6 (the processor 62) according to this embodiment.

The advertisement management system 2 (an example of an information providing system) includes a plurality of vehicles 3, a plurality of mobile terminals 4, an movement information management server 5, an advertisement management server 6 that can communicate with the plurality of vehicles 3, the plurality of mobile terminals 4, and the movement information management server 5, and a plurality of digital signage terminals 7 that are communicatively connected to the advertisement management server 6 and that are installed near a predetermined road, that is, beside a road (which includes a case in which a digital signage terminal is installed on a wall of a building located beside the road) or just above the road. That is, the advertisement management system 2 includes the movement information management system 1, the advertisement management server 6 that can communicate with elements of the movement information management system 1, and a plurality of digital signage terminals 7. Although details thereof will be described later, the advertisement management system 2 manages delivery of an advertisement to the plurality of vehicles 3, the plurality of mobile terminals 4, and the plurality of digital signage terminals 7 and the like. Hereinafter, description of the vehicle 3 and the movement information management server 5 will not be repeated.

The processor 42 of a mobile terminal 4 includes a unique identifier transmitting unit 426 as described above.

The unique identifier transmitting unit 426 issues unique identifiers (unique identifiers) which do not overlap for the plurality of mobile terminals 4 and transmits the unique identifiers to the advertisement management server 6 via the communication processing unit 421. A unique identifier may be an identifier (for example, an advertisement ID of a smartphone) which is defined as being specific to each mobile terminal 4 or a Hash ID which is automatically generated using an existing Hash function, for example, from a mail address, a phone number, or the like registered in a mobile terminal of a user.

The unique identifier transmitting unit 426 transmits the issued unique identifiers to a target server via the communication processing unit 421 without depending on a browser which is used when a request for browsing a web site of the Internet is transmitted to the target server in response to an operation of a mobile terminal 4 which is performed by a user. When the target server is included in a so-called advertisement network centered on the advertisement management server 6, data of the unique identifiers is transmitted to the advertisement management server 6 in correlation with data of browsing histories. Accordingly, so-called action histories of web sites which have been browsed by users of the plurality of mobile terminals 4 can be understood by the advertisement management server 6. Examples of the browser which is used in a mobile terminal 4 include browsers in a plurality of applications installed therein, for example, social networking service (SNS) applications, mail applications, electronic commerce (EC) applications, in addition to a default web browser. Accordingly, since unique identifiers are transmitted to the advertisement network including the advertisement management server 6 without depending on the types of the browsers, browsing histories of the Internet can be shared by a plurality of applications. For example, when a unique identifier is a Hash ID which is generated using a mail address, a phone number, or the like of a user of a mobile terminal 4 and there are two or more mobile terminals 4 which are used by the same user among the plurality of mobile terminals 4, online action histories of the different mobile terminals 4 can be integrated as an action history of the same user.

The advertisement management server 6 includes a communication device 61 and a processor 62.

The communication device 61 is a device that directionally communicates with the vehicles 3, the mobile terminals 4, and the movement information management server 5 via a predetermined communication network, for example, a mobile phone network with a plurality of base stations as terminals or an Internet network under the control of the processor 62 (specifically, a communication processing unit 621).

The processor 62 performs various control processes in the advertisement management server 6. The processor 62 may be mainly constituted, for example, by one or more server computers including a CPU, a RAM, a ROM, an auxiliary storage device, and an I/O. The processor 62 includes a communication processing unit 621, a user information storage processing unit 622, a destination acquiring unit 623, and an advertisement delivering unit 624 as functional units which are embodied, for example, by causing the CPU to execute one or more programs stored in the ROM or the auxiliary storage device. The processor 62 also includes a storage unit 629 as a storage area which is defined in the auxiliary storage device or an external storage device connected to the server computer. A advertisement DB 6291, a unique identifier DB 6292, an online action history DB 6293, and a learning parameter 6294 are stored in the storage unit 629.

The communication processing unit 621 controls the communication device 61 such that it transmits and receives various signals (such as an information signal and a control signal) to and from the vehicles 3, the mobile terminals 4, and the movement information management server 5.

The user information storage processing unit 622 performs a process of collecting a variety of information related to users of the plurality of mobile terminals 4 from the plurality of mobile terminals 4, the movement information management server 5, and other servers (for example, a web server included in the advertisement network) and storing the collected information in the storage unit 629.

For example, the user information storage processing unit 622 stores unique identifiers received from the plurality of mobile terminals 4 by the communication processing unit 621 in the storage unit 629 in correlation with the plurality of mobile terminals 4 (specifically, terminal IDs) as transmission sources thereof and constructs the unique identifier DB 6292. Accordingly, a correlation between the unique identifiers and the mobile terminals 4 can be understood.

For example, the user information storage processing unit 622 stores information browsing histories (net information browsing histories) via the Internet which are correlated with the unique identifiers which are received from a plurality of web servers in the advertisement network centered on the advertisement management server 6 by the communication processing unit 621 stores in the storage unit 629 in correlation with the plurality of mobile terminals 4 based on the unique identifier DB 6292, and constructs the online action history DB 6293. Accordingly, it is possible to understand characteristics related to tastes (taste characteristics) such as interest/concern of users based on the online action histories of the users of the plurality of mobile terminals 4 as will be described later.

The user information storage processing unit 622 may construct the online action history DB 6293 of the users of the mobile terminals 4 by using an existing method using cookies (HTTP cookies) or the like along with the unique identifiers.

The destination acquiring unit 623 (an example of a current information acquiring unit) acquires a destination to which a vehicle 3 travels. For example, the destination acquiring unit 623 may acquire information on a destination which is automatically set in response to a user's operation or based on past search histories in a navigation device (not illustrated) mounted in the vehicle 3 from the vehicle 3 via the communication processing unit 621. In this case, the vehicle 3 may directly transmit information on a destination to the advertisement management server 6 via the DCM 31, or may transmit the information to the movement information management server 5. In the latter, the destination acquiring unit 623 has only to transmit an inquiry to the movement information management server 5 via the communication processing unit 621. For example, the destination acquiring unit 623 may acquire information on a destination set in a vehicle 3 or a mobile terminal 4 of a user in the vehicle 3 from a navigation server (not illustrated) that provides a navigation service which can be used by a plurality of vehicles 3 and a plurality of mobile terminals 4 via the communication processing unit 621. When a user of a mobile terminal 4 is in a vehicle 3, the destination acquiring unit 623 may acquire a destination of the vehicle 3 by estimating the destination of the vehicle 3 based on the online action history DB 6293. In this case, the destination acquiring unit 623 can ascertain the user of the mobile terminal 4 in the vehicle 3 among the users of a plurality of mobile terminals 4 by inquiring of the movement information management server 5 via the communication processing unit 621. The information acquired by the user of the mobile terminal 4 via the online including the SNS can include information serving as a reason of an action which is carried out later by the user (hereinafter referred to as a "next action"). Accordingly, there is a likelihood that the information acquired only by the user of the mobile terminal 4 will affect selection of a next action of the user of the mobile terminal 4, specifically, a place or an establishment which the user visits, that is, a destination or the like. That is, it can be considered that an online action history of a user of a mobile terminal 4 and a visit history (a visited POI or area) of the user have a certain relationship (such as a correlation, a relative tendency, or a causal relationship). Accordingly, as an offline process of estimating a destination in a previous step, the destination acquiring unit 623 analyzes a relationship between a use history of the user and a visit place (a destination) of the user of the mobile terminal 4, for example, for each area or road link in which the vehicle 3 is located based on the online action history (the online action history DB 6293) of each user of a plurality of mobile terminals 4 and the visit history of the user (trip information acquired from the movement information management server 5, and sequentially learns the analysis results. More specifically, the destination acquiring unit 623 may estimate a destination based on learning results (the learning parameter 6294) which are sequentially updated with the online action history of a user of a specific mobile terminal 4 and an area or a road link (a link ID) in which the user is currently located as input data. When two or more user of the mobile terminals 4 are in a vehicle 3, the destination acquiring unit 623 may estimate a destination with high community among destinations which are estimated from the online action histories of the two or more users of the mobile terminals 4.

The advertisement delivering unit 624 performs a process of delivering an advertisement to a plurality of vehicles 3, a plurality of mobile terminals 4, and a plurality of digital signage terminals 7. Data of an advertisement (advertisement data) to be delivered which is input to the advertisement management server 6 is stored in the advertisement DB 6291. In the advertisement to be delivered which is input to the advertisement management server 6, information on a guidance destination (an actual store that sells a target product of the advertisement) (guidance destination information) to which it is intended to guide a user, characteristic information on a target user (user characteristic target information) who is a target of the advertisement, and information on a location (for example, an area including a POI at which most target users gather or an area close to the guidance destination) which is a target of the advertisement (location target information) are set in advance, and is stored in the advertisement DB 6291 in correlation with the advertisement data. The advertisement delivering unit 624 may determine a delivery destination of the advertisement to be delivered among the plurality of vehicles 3, the plurality of mobile terminals 4, and the plurality of digital signage terminals 7 based on the guidance destination information, the user characteristic target information, the location target information, and the like and may transmit the advertisement data to the delivery destination via the communication processing unit 621.

For example, the advertisement delivering unit 624 may deliver the advertisement based on the counting results of the numbers of times of utterance of a plurality of words which are extracted as a feature word and which are counted for each road link and for each POI as a departure point and a destination which are stored in the utterance number count DB 5200I in the movement information management server 5. In this case, the advertisement delivering unit 624 can understand details of the utterance number count DB 5200I by inquiring of the movement information management server 5 via the communication processing unit 621.

Specifically, the processor 52 of the movement information management server 5 having received an inquiry may extract a road link (a target road link) with a high likelihood that a vehicle 3 in which a user suitable as a target of the advertisement (a target user) will pass through the road link among a plurality of road links based on the utterance number count DB 5200I. The processor 52 may extract a POI (a target POI) as a destination to which the vehicle 3 which has been boarded by the target user of the advertisement is likely to move. More specifically, the movement information management server 5 may extract a POI as a road link or a destination in which the number of times of utterance of a word belonging to the same genre of tastes as one or more genres of tastes of a product (such as goods and services) of the advertisement is relatively high. A genre of tastes is a plurality of genres into which predefined taste characteristics of users are classified. The correspondence between words and genres of tastes is defined in advance, for example, in a correspondence table (not illustrated) stored in the storage unit 629 or the storage unit 5200. For example, the movement information management server 5 extracts a POI as a road link or a destination in which there are a predetermined number of (for example, three) words belonging to the same genre of tastes as the genre of tastes to which a target of the advertisement belongs among words ranked in first to fifth in the counting results of the number of times of utterance.

The advertisement delivering unit 624 delivers the advertisement to a vehicle 3 located in the extracted target road link, a mobile terminal 4 of a user in the vehicle 3, and a digital signage terminal 7 adjacent to the target road link. The advertisement delivering unit 624 delivers the advertisement to a vehicle 3 with the extracted target POI as a destination, that is, a vehicle 3 of which the destination acquired by the destination acquiring unit 623 matches the target POI, a mobile terminal 4 of a user in the vehicle 3, and a digital signage terminal 7 adjacent to a road link through which the vehicle 3 passes. Accordingly, as described above, an occupant in a vehicle 3 passing through the road links or a vehicle 3 moving with the POIs as a destination can be provided with advertisement information matching a purpose of actions thereof. Accordingly, it is possible to easily provide advertisement information to users who are suitable as an advertisement target and to improve effects of delivery of an advertisement.

The advertisement delivering unit 624 can identify a vehicle 3 located in the target road link or a mobile terminal 4 of a user in the vehicle 3 by inquiring of the movement information management server 5 via the communication processing unit 621. Specifically, the processor 52 of the movement information management server 5 can identify the vehicle 3 and the mobile terminal 4 based on the current position information of the vehicles 3 acquired by the current position information acquiring unit 5214, the map information DB 5200A, and the output results of the boarding ascertaining unit 5207. The advertisement delivering unit 624 can identify a target digital signage terminal 7 by comparing a link ID of the target road link with link IDs of road links adjacent to the digital signage terminals 7 which are registered in the signage information DB 6295. By inquiring of the movement information management server 5 via the communication processing unit 621, the advertisement delivering unit 624 can identify a mobile terminal 4 of a user in a vehicle 3 with the target POI as a destination or a digital signage terminal 7 adjacent to a road link through which the vehicle 3 passes. Specifically, the processor 52 of the movement information management server 5 can identify the mobile terminal 4 based on the output result of the boarding ascertaining unit 5207 for the vehicle 3 with the target POI as a destination or the like. The advertisement delivering unit 624 can identify a target digital signage terminal 7 by comparing a link ID of a road link corresponding to the current position information of the vehicle 3 with the target POI as a destination which is returned from the movement information management server 5 and which is acquired by the current position information acquiring unit 5214 with road links of the digital signage terminals 7 which are registered in the signage information DB 6295.

Figure 15:
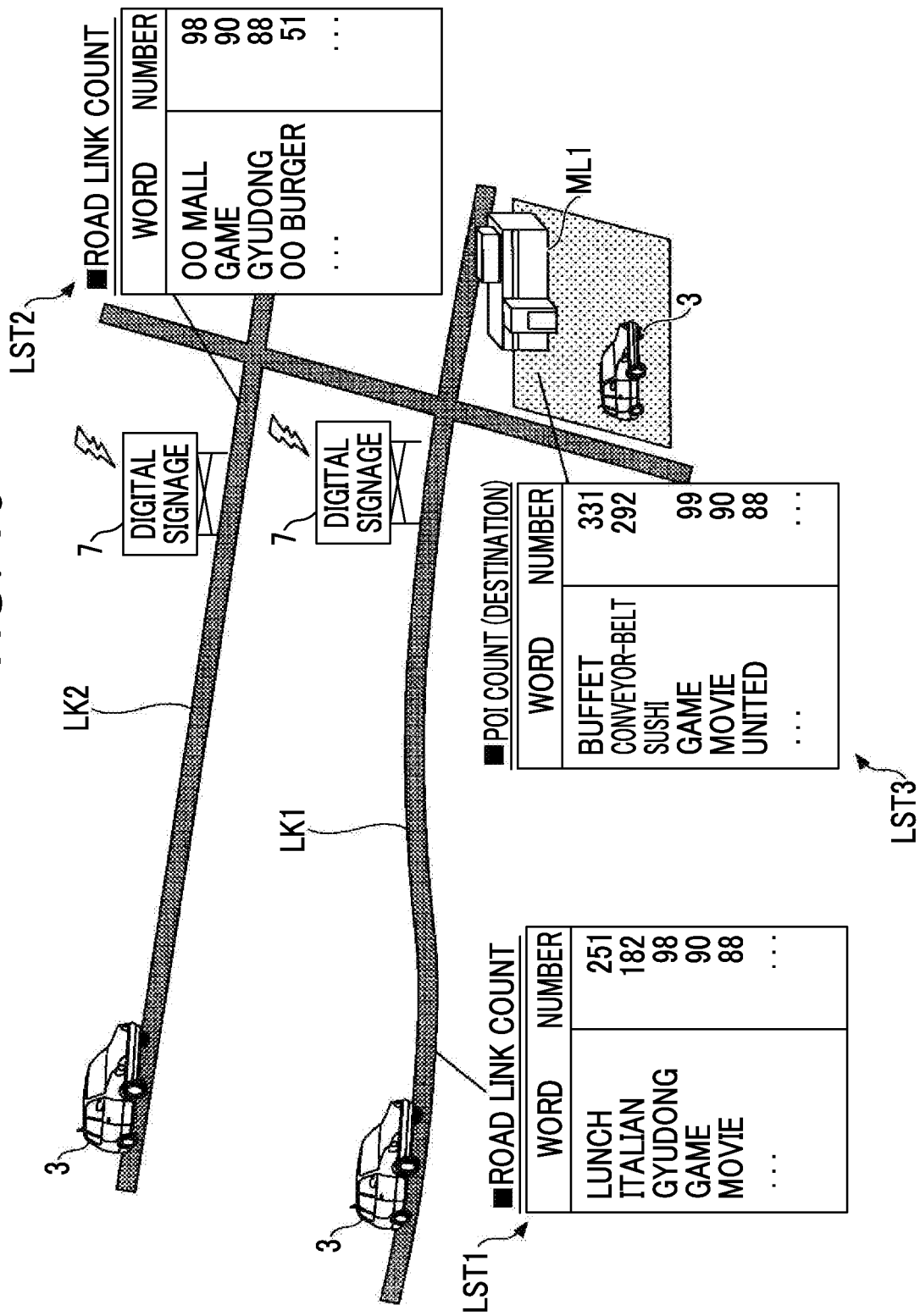
FIG. 15 is a functional block diagram illustrating an example of a functional configuration of an advertisement management server.

FIG. 15 is a diagram schematically illustrating counting results of a plurality of different words extracted as a feature word by the utterance number counting unit 5212. Specifically, counting results LST1 to LST3 of the number of times of utterance of a plurality of different words extracted as a feature word which are counted for road links LK1 and LK2 and a shopping mall ML1 as a POI of a destination are illustrated on a schematic map.

As illustrated in FIG. 15, there are words which are ranked relatively high with the different numbers of times of utterance between the counting results LST1 and LST2 even in the road links LK1 and LK2 in the same area. That is, there may be a likelihood that a purpose of actions of occupants of vehicles 3 passing through the road link LK1 and the road link LK2 will be greatly different from each other. Accordingly, for example, by using the counting results LST1 and LST2, the advertisement delivering unit 624 can deliver different advertisements matching the purpose of actions of the occupants of the vehicles 3 passing through the road links LK1 and LK2 to digital signage terminals 7 adjacent to the road link LK1 and the road link LK2.

As illustrated in FIG. 15, there are words which is ranked relatively high with the different numbers of times of utterance between the counting result LST1 and the counting result LST3 even in the road link LK1 and the shopping mall ML1 which are adjacent to each other. That is, there may be a likelihood that a purpose of actions of occupants of a vehicle 3 passing through the road link LK1 and a vehicle 3 with the shopping mall ML1 adjacent to the road link LK1 as a destination will be greatly different from each other. Accordingly, for example, by selectively using the counting results of the POIs and the counting results of the road links or using both the counting results of the POIs and the counting results of the road links, the advertisement delivering unit 624 can more appropriately deliver advertisements matching the purpose of actions of the occupants of the vehicles 3.

Referring back to FIG. 14, for example, the advertisement delivering unit 624 may deliver an advertisement to a vehicle 3, a mobile terminal 4 of a user in the vehicle 3, and a digital signage terminal 7 adjacent to a road link through which the vehicle 3 passes based on the feature word and the number of times of utterance which are registered as the additional relation information for correlating the mobile terminals 4 and the vehicles 3 which are used by the users thereof in the used vehicle DB 5200E. In this case, by inquiring of the movement information management server 5 via the communication processing unit 621, the advertisement delivering unit 624 can ascertain details of the used vehicle DB 5200E. By inquiring of the movement information management server 5 via the communication processing unit 621, the advertisement delivering unit 624 can ascertain the vehicle 3 which is boarded by the user of the mobile terminal 4 or the vehicle 3 which is boarded by the user of the mobile terminal 4 and which passes through a road adjacent to the digital signage terminal 7. More specifically, the movement information management server 5 can ascertain the vehicle 3 in which the user of the mobile terminal 4 is by ascertaining the vehicle 3 onboard-correlated with one of a plurality of mobile terminals 4 in response to an inquiry. The movement information management server 5 can ascertain the vehicle 3 located in a road link adjacent to the digital signage terminal 7 among the vehicles 3 onboard-correlated with one of the plurality of mobile terminals 4. The movement information management server 5 returns an inquiry result to the advertisement management server 6. As described above, there is a high likelihood that a feature words registered as the additional relation information for correlating the vehicles 3 with the mobile terminals 4, particularly feature words with the relatively large number of times of utterance, will be associated with the purpose of actions of the users of the mobile terminals 4 when moving in the vehicles 3. Accordingly, the advertisement delivering unit 624 or the movement information management server 5 having received an inquiry can determine whether a purpose of actions of a user of a mobile terminal 4 using a certain vehicle 3 is suitable for one or more genre of tastes to which an advertisement object belongs based on the registered feature words and the numbers of times of utterance thereof. For example, the advertisement delivering unit 624 or the movement information management server 5 may determine the suitability depending on whether a word belonging to the same genre of tastes as one or more genres of tastes to which an advertisement object belongs is registered with the relatively large number of times of utterance. More specifically, the advertisement delivering unit 624 or the movement information management server 5 may determine that there is suitability, for example, when there are predetermined number of (for example, three) words belonging to the same genre of tastes as the genre of tastes to which an advertisement object belongs among words of which the numbers of times of utterance are ranked in first to fifth ranks and which are registered as the additional relation information. The advertisement delivering unit 624 may deliver an advertisement to a mobile terminal 4 of a user in a vehicle 3 determined to be suitable, the vehicle 3 in which the user is, and a digital signage terminal 7 adjacent to a road link through which the vehicle 3 passes. Accordingly, it is possible to provide advertisement information to an occupant moving in the vehicle 3 depending on the purpose of actions thereof. Accordingly, it is possible to easily provide advertisement information to a user which is suitable as an advertisement target and to improve effects of delivery of an advertisement.

The advertisement delivering unit 624 may deliver an advertisement to a mobile terminal 4 of a user using the vehicle 3 based on feature words and the numbers of times of utterance thereof which are registered as additional relation information in the used vehicle DB 5200E without depending on whether the user is in the vehicle 3. This is because the feature words and the numbers of times of utterance thereof which are registered as the additional relation information can be understood as information on general taste characteristics of the users of the mobile terminals 4.

For example, the advertisement delivering unit 624 may deliver an advertisement to a vehicle 3, a mobile terminal 4, and a digital signage terminal 7 installed near a road through which the vehicle 3 which have been boarded by users of two or more mobile terminals 4 passes based on the user association level DB 5200F in the movement information management server 5. In this case, by inquiring of the movement information management server 5 via the communication processing unit 621, the advertisement delivering unit 624 can ascertain details of the user association level DB 5200F. The advertisement delivering unit 624 can ascertain a vehicle 3 which has been boarded by a user of a mobile terminal 4 or a vehicle 3 which has been boarded by the user of the mobile terminal 4 and which passes through a road adjacent to the digital signage terminal 7 by inquiring of the movement information management server 5 via the communication processing unit 621. More specifically, the movement information management server 5 can ascertain the vehicle 3 in which the user of the mobile terminal 4 is by ascertaining the vehicle 3 onboard-correlated with one of a plurality of mobile terminals 4 in response to an inquiry. The movement information management server 5 can ascertain the vehicle 3 located in a road link adjacent to the digital signage terminal 7 among the vehicles 3 onboard-correlated with one of the plurality of mobile terminals 4. The movement information management server 5 returns an inquiry result to the advertisement management server 6. For example, the advertisement delivering unit 624 may deliver an advertisement belonging to common taste characteristics, that is, a common genre of tastes to the mobile terminals 4 of two or more users having relatively strong association (with a relatively high association level) among the users of a plurality of mobile terminals 4. Common taste characteristics (genre of tastes) of two or more users can be determined, for example, depending on feature words and the numbers of times of utterances which are registered as the additional relation information in the used vehicle DB 5200E. Accordingly, since users having a relatively strong association have a close relation of affecting each other, the users are likely to have an interest/concern in goods and services to be advertised, for example, by sharing the same browsed advertisement, and it is thus possible to improve effects of delivery of an advertisement. For example, when two or more users having a relatively strong association are in a vehicle 3, the advertisement delivering unit 624 may deliver an advertisement belonging to common taste characteristics, that is, a common genre of tastes, to the mobile terminals 4 of the two or more users. For example, when two or more users having a relatively strong association passes through a road adjacent to a digital signage terminal 7 in a vehicle 3, the advertisement delivering unit 624 may deliver an advertisement belonging to common taste characteristics, that is, a common genre of tastes, of the two or more users to the digital signage terminal 7. Accordingly, since the users move in the vehicle 3, the users are likely to share information of the common genre of tastes and are likely to have an interest/concern in goods and services to be advertised, it is thus possible to further improve effects of delivery of an advertisement.

[Details of Operation of Advertisement Management System]

Details of the operation of the advertisement management system 2 will be described below with reference to FIGS. 16 and 17.

Figure 16:
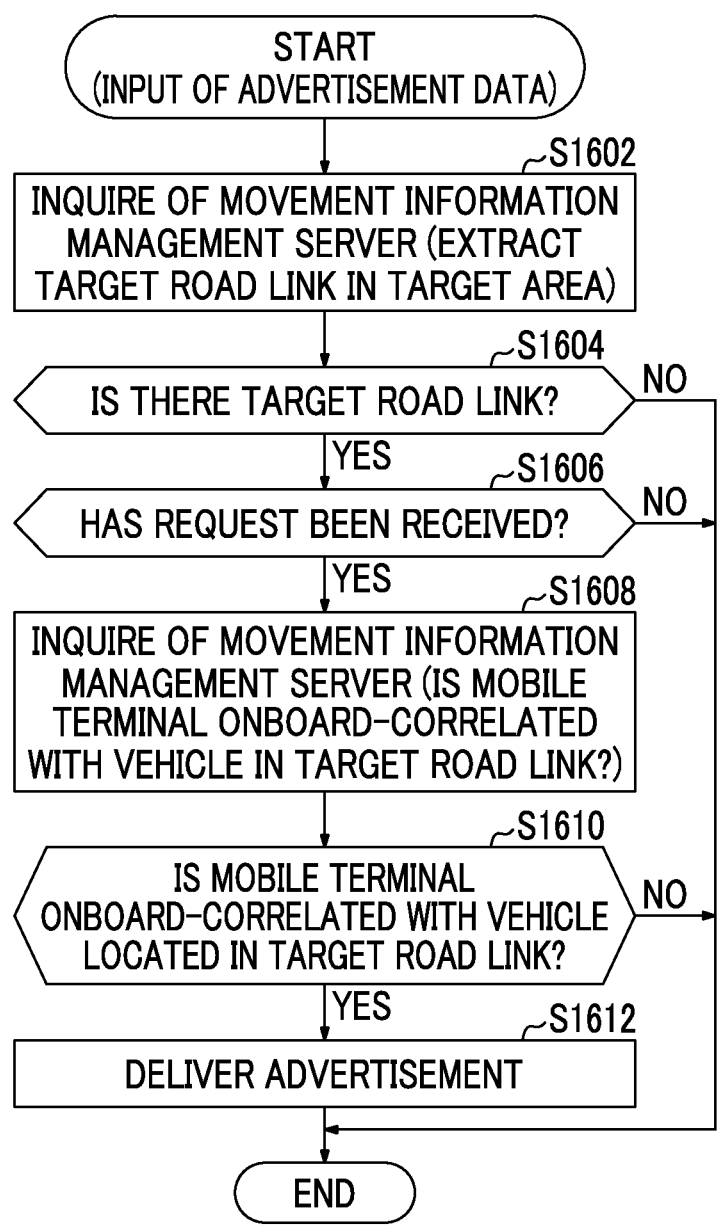
FIG. 16 is a flowchart schematically illustrating an example of a process of delivering an advertisement to a mobile terminal which is performed by the advertisement management server (the processor)

FIG. 16 is a flowchart schematically illustrating an example of an advertisement delivering process which is performed by the processor 62 of the advertisement management server 6. Specifically, FIG. 16 illustrates a specific example of an advertisement delivering process based on the counting results of the number of times of utterance of each of a plurality of words extracted as feature words which are counted for each road link stored in the utterance number count DB 5200I. The processing routine of this flowchart is started, for example, when an advertisement is received by (input to) the advertisement management server 6, and is repeatedly performed at predetermined time intervals in a delivery period of the advertisement which is defined in advance.

In Step S1602, the advertisement delivering unit 624 inquires of the movement information management server 5 about a target road link in a predetermined area based on location target information of the advertisement via the communication processing unit 621. Accordingly, the processor 52 of the movement information management server 5 receiving the inquiry extracts the target road link among a plurality of road links in the area based on the utterance number count DB 5200I and returns the extraction result to the advertisement management server 6.

In Step S1604, the advertisement delivering unit 624 checks the extraction result received from the movement information management server 5 by the communication processing unit 621 and determines whether there is an extracted target road link. The advertisement delivering unit 624 performs Step S1606 when there is an extracted target road link, and ends this processing routine otherwise.

In Step S1606, the advertisement delivering unit 624 determines whether an advertisement delivery request has been received from a predetermined application installed in the mobile terminal 4 by the communication processing unit 621. The advertisement delivering unit 624 performs Step S1608 when an advertisement delivery request from the mobile terminal 4 has been received by the communication processing unit 621, and ends this processing routine otherwise.

In Step S1608, the advertisement delivering unit 624 inquires of the movement information management server 5 whether the user of the mobile terminal 4 as a transmission source of the advertisement delivery request is in the vehicle 3 via the communication processing unit 621. That is, the advertisement delivering unit 624 inquires of the movement information management server 5 whether the mobile terminal 4 is onboard-correlated with the vehicle 3 located in the target road link via the communication processing unit 621. Accordingly, the processor 52 of the movement information management server 5 checks whether the mobile terminal 4 is onboard-correlated with the vehicle 3 based on the used vehicle DB 5200E and the output result of the boarding ascertaining unit 5207. The processor 52 ascertains whether the vehicle 3 onboard-correlated with the mobile terminal 4 is located in the target road link based on the map information DB 5200A and returns the ascertainment result to the advertisement management server 6.

In Step S1610, the advertisement delivering unit 624 determines whether the mobile terminal 4 is onboard-correlated with the vehicle 3 located in the target road link based on the ascertainment result received from the movement information management server 5 by the communication processing unit 621. The advertisement delivering unit 624 performs Step S1612 when the mobile terminal 4 is onboard-correlated with the vehicle 3 located in the target road link, and ends this processing routine otherwise.

In Step S1612, the advertisement delivering unit 624 delivers the advertisement to the mobile terminal 4 via the communication processing unit 621 and ends this processing routine. Accordingly, it is possible to deliver an advertisement to only a mobile terminal 4 of a user in a vehicle 3 located in a target road link. Accordingly, as described above, it is possible to provide advertisement information matching a purpose of actions to the user of the mobile terminal 4 in the vehicle 3. In addition, since advertisement information is likely to be provided to only users more suitable as an advertisement target, it is possible to achieve improvement in effects of delivery of an advertisement.

In this example, an advertisement is delivered in response to a request from the mobile terminal 4 to the advertisement management server 6, but the advertisement may be push-delivered from the advertisement management server 6 side. In this case, the advertisement delivering unit 624 can inquire of the movement information management server 5 whether users of a plurality of mobile terminals 4 as a target of push delivery are in vehicles 3 located in the target road link via the communication processing unit 621.

In this example, an advertisement is delivered to a mobile terminal 4 of a user in a vehicle 3 located in a target road link, but an advertisement may be delivered to a mobile terminal 4 of a user in a vehicle 3 moving toward a target POI as described above.

In this example, an advertisement is delivered to a mobile terminal 4 of a user in a vehicle 3, but an advertisement may be delivered to a vehicle 3 located in a target road link or a vehicle 3 moving toward a target POI as described above. In this case, the advertisement delivering unit 624 can inquire of the movement information management server 5 about a vehicle 3 located in the target road link via the communication processing unit 621. Accordingly, the processor 52 of the movement information management server 5 extracts a vehicle 3 located in the target road link among a plurality of vehicles 3 based on the map information DB 5200A, the probe information DB 5200B, and the utterance number count DB 5200I and returns the extraction result to the advertisement management server 6. The advertisement delivering unit 624 may deliver an advertisement to a digital signage terminal 7 adjacent to the target road link or a digital signage terminal 7 through which the vehicle 3 moving toward the target POI passes. In this case, the advertisement delivering unit 624 can inquire of the movement information management server 5 about the target road link via the communication processing unit 621. Accordingly, the advertisement delivering unit 624 can extract a digital signage terminal 7 to which an advertisement will be delivered by comparing a link ID of a target road link returned from the movement information management server 5 with a link ID of a road link adjacent to the digital signage terminal 7 registered in the signage information DB 6295.

Figure 17:
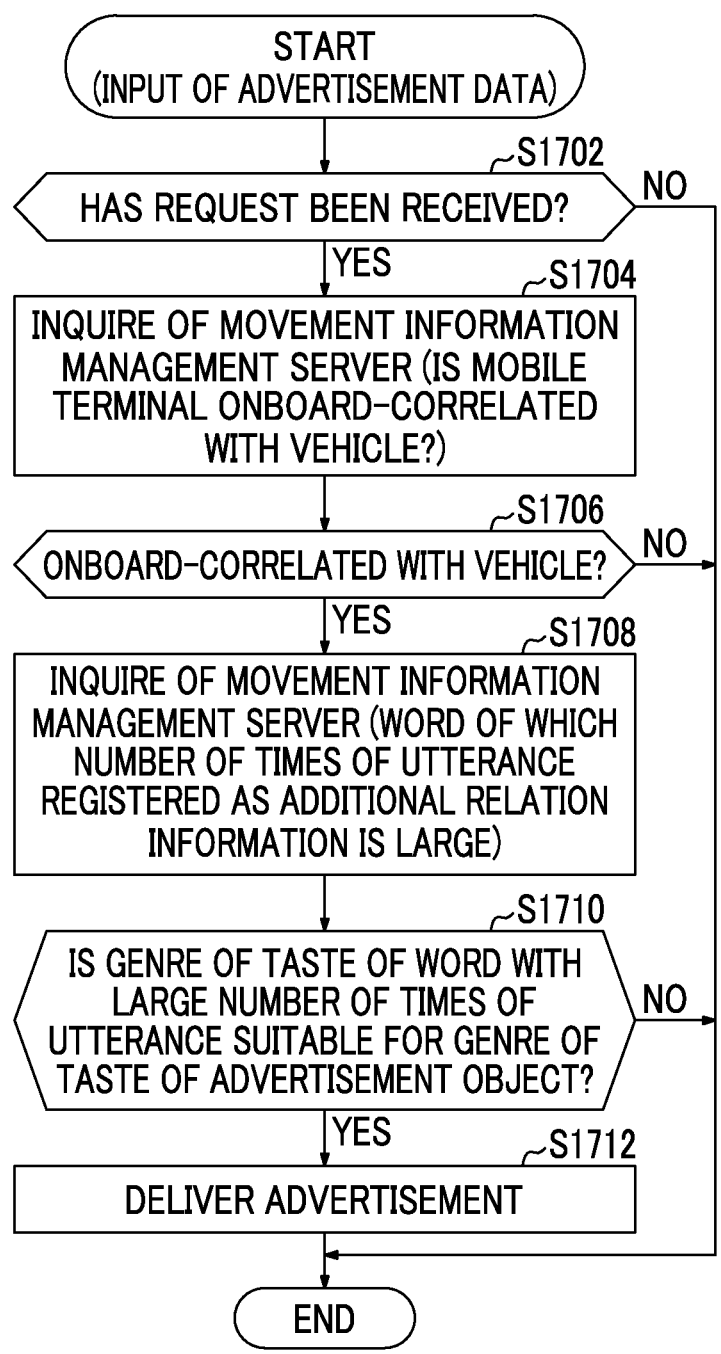
FIG. 17 is a flowchart schematically illustrating another example of the process of delivering an advertisement to a mobile terminal which is performed by the advertisement management server (the processor).

FIG. 17 is a flowchart schematically illustrating another example of the advertisement delivering process which is performed by the processor 62 of the advertisement management server 6. Specifically, FIG. 17 illustrates a specific example of the advertisement delivering process based on feature words and the numbers of times of utterance thereof which are registered as the additional relation information for correlating mobile terminals 4 and vehicles 3 used by users thereof in the used vehicle DB 5200E. The processing routine of this flowchart is started, for example, when an advertisement is received by (input to) the advertisement management server 6, and is repeatedly performed at predetermined time intervals in a prescribed delivery period of the advertisement.

In Step S1702, the advertisement delivering unit 624 determines whether an advertisement delivery request has been received from a predetermined application installed in a mobile terminal 4 by the communication processing unit 621. The advertisement delivering unit 624 performs Step S1704 when an advertisement delivery request from the mobile terminal 4 has been received by the communication processing unit 621, and ends this processing routine otherwise.

In Step S1704, the advertisement delivering unit 624 inquires of the movement information management server 5 whether a user of the mobile terminal 4 is in a vehicle 3 via the communication processing unit 621. That is, the advertisement delivering unit 624 inquires of the movement information management server 5 whether the mobile terminal 4 is onboard-correlated with the vehicle 3 via the communication processing unit 621. Accordingly, the processor 52 of the movement information management server 5 checks whether the mobile terminal 4 and the vehicle 3 are onboard-correlated with each other based on the used vehicle DB 5200E and the output result of the boarding ascertaining unit 5207, and returns the check result to the advertisement management server 6.

In Step S1706, the advertisement delivering unit 624 determines whether the mobile terminal 4 and the vehicle 3 are onboard-correlated with each other based on the check result received from the movement information management server 5 by the communication processing unit 621. The advertisement delivering unit 624 performs Step S1708 when the mobile terminal 4 is onboard-correlated with the vehicle 3, and ends this processing routine otherwise.

In Step S1708, the advertisement delivering unit 624 inquires of the movement information management server 5 about words (for example, words ranked in first to fifth) of which the number of times of utterance is relatively large among a plurality of words registered as additional relation information for correlating the vehicle 3 and the mobile terminal 4 in the used vehicle DB 5200E via the communication processing unit 621. Accordingly, the movement information management server 5 extracts words of which the number of times of utterance is relatively large in the additional relation information for correlating the vehicle 3 with the mobile terminal 4, which is registered in the used vehicle DB 5200E, and returns the extraction result to the communication processing unit 621.

In Step S1704, the advertisement delivering unit 624 may inquire of the movement information management server 5 to include the inquiry details in Step S1708. In this case, a response from the movement information management server 5 to the advertisement management server 6 in response to the inquiry in Step S1704 includes the extraction result and thus Step S1708 may be omitted.

In Step S1710, the advertisement delivering unit 624 determines whether a genre of tastes of words of which the number of times of utterance is relatively large is suitable for a genre of tastes of an advertisement target based on the extraction result received from the movement information management server 5 by the communication processing unit 621. For example, the advertisement delivering unit 624 may determine that there is suitability when there are a predetermined number of (for example, three) words belonging to the same genre of tastes as the genre of tastes to which the advertisement target belongs among the words of which the number of times of utterance ranges from a first rank to a fifth rank as described above. Then advertisement delivering unit 624 performs Step S1710 when the genre of tastes of words of which the number of times of utterance is relatively large is suitable for the genre of tastes of the advertisement target, and ends this processing routine otherwise.

In Step S1712, the advertisement delivering unit 624 delivers the advertisement to the mobile terminal 4 via the communication processing unit 621, and ends this processing routine. Accordingly, it is possible to deliver an advertisement to only a mobile terminal 4 of a user in a vehicle 3 and a mobile terminal 4 of a user of which contents of utterance in the vehicle 3, specifically, a genre of tastes of words of which the number of times of utterance is relatively large is suitable for a genre of tastes of an advertisement target. Accordingly, as described above, it is possible to provide advertisement information matching a purpose of actions to a user of a mobile terminal 4 in a vehicle 3. Since advertisement information is likely to be provided to only a user which is suitable as an advertisement target, it is possible to achieve improvement in effects of delivery of an advertisement.

In this example, an advertisement is delivered in response to a request transmitted from a mobile terminal 4 to the advertisement management server 6, but an advertisement may be push-delivered from the advertisement management server 6 side. In this case, the advertisement delivering unit 624 can inquire of the movement information management server 5 whether a plurality of mobile terminals 4 to be subjected to push delivery are in vehicles 3 via the communication processing unit 621. The advertisement delivering unit 624 can inquire of the movement information management server 5 about words of which the number of times of utterance is relatively large among a plurality of words registered as additional relation information for correlating the vehicles 3 with the mobile terminals 4 in the used vehicle DB 5200E regarding the mobile terminals 4 which have been ascertained to be in the vehicles 3 and which are subjected to push delivery.

In this example, an advertisement is delivered to the mobile terminals 4 of the users in the vehicles 3, but an advertisement may be delivered to the vehicles 3 which have been boarded by the users of the mobile terminals 4 as described above. In this case, the advertisement delivering unit 624 can inquire of the movement information management server 5 about vehicles 3 which have been boarded by the users of the mobile terminals 4 and words which are ranked relatively high among a plurality of words registered in the additional relation information for correlating the vehicles 3 and the mobile terminals 4 in the used vehicle DB 5200E via the communication processing unit 621. The advertisement delivering unit 624 may deliver an advertisement to digital signage terminals 7 adjacent to road links through which the vehicles 3 boarded by the mobile terminals 4 pass. In this case, the advertisement delivering unit 624 can inquire of the movement information management server 5 about the road links through which the vehicles 3 onboard-correlated with the mobile terminals 4 pass and words which are ranked relatively high among a plurality of words registered in the additional relation information for correlating the vehicles 3 with the mobile terminals 4 in the used vehicle DB 5200E via the communication processing unit 621.

In this way, in this embodiment, the utterance data storage processing unit 5209 acquires contents of utterance of occupants in a plurality of vehicles 3, and the feature word extracting unit 5210 extracts feature words from the acquired contents of utterance. The utterance-time information acquiring unit 5211 acquires information on a position of the vehicle 3 or information on a destination when a feature word is uttered, and the utterance number counting unit 5212 counts the number of times of utterance of each of a plurality of different words extracted as a feature word for each of position indicators (for example, a road link, a crossing, and an area) corresponding to the position of the vehicle 3 or for each of destination indicators (for example, a POI and an area) corresponding to the destination of the vehicle 3. The current position information acquiring unit 5214 acquires information on a position of a predetermined target vehicle (a vehicle 3) which has been boarded by a user, and the destination acquiring unit 623 acquires information on a destination of the target vehicle which has been boarded by the user. The advertisement delivering unit 624 provides advertisement information to the user based on the counting results of the position indicator (such as a road link) corresponding to the position of the target vehicle or the destination indicator (such as a POI) corresponding to the destination of the target vehicle from the utterance number counting unit 5212.

Accordingly, for each of position indicators corresponding to a position of a vehicle such as a road link or for each of destination indicators corresponding to a destination of a vehicle such as a POI, the number of times of utterance of a plurality of words extracted as a feature word in contents of utterance of occupants in a plurality of vehicles 3 is counted. Here, words of which the number of times of utterance counted for each of position indicators corresponding to the positions of the vehicles 3 or for each of destination indicators corresponding to the destinations of the vehicles 3 is relatively large are words which the occupants in the vehicles 3 passing through that place or the vehicles 3 moving to the destinations talk often and there is a high likelihood that the words will be words associated with a movement intention of an arbitrary occupant moving in an arbitrary vehicle 3 from a macro-perspective. Accordingly, by using the counting results for a position indicator corresponding to a position of a target vehicle or a destination indicator corresponding to a destination of the target vehicle, it is possible to provide information matching a purpose of actions without recognizing specific contents of conversation of users in the target vehicle.

In this embodiment, a vehicle in which voice data is acquired and a vehicle (a target vehicle) which is a boarded by a user to which advertisement information is provided are the same vehicle 3, but may be different vehicles. For example, advertisement information may be delivered to target vehicles other than a plurality of vehicles 3 in which voice data is acquired. Voice data may be acquired from some of a plurality of vehicles 3, and advertisement information may be provided to users in all of the plurality of vehicles 3. In this embodiment, advertisement information is provided to a user in a target vehicle (a vehicle 3), but information (for example, recommendation information of a visited establishment) other than advertisement information or the like may be provided.

In this embodiment, the utterance number counting unit 5212 may count the number of times of utterance of each of a plurality of different words which are extracted as a feature word from the contents of utterance after a predetermined time point by the feature word extracting unit 5210 for each of position indicators corresponding to the position of the vehicle 3 or for each of destination indicators corresponding to the destination of the vehicle 3.

Accordingly, the number of times of utterance for each of a plurality of words which are extracted as a feature word from relatively new contents of utterance after a predetermined time point is counted. Accordingly, by appropriately setting the predetermined time point, it is possible to appropriately provide information matching a purpose of actions of occupants in consideration of a latest situation of a position indicator corresponding to a position of a target vehicle or a destination indicator corresponding to a destination of the target vehicle.

In this embodiment, the advertisement delivering unit 624 may provide advertisement information associated with a word of which the number of times of utterance of each of a plurality of words counted for each of position indicators corresponding to the position of the target vehicle or for each of destination indicators corresponding to the destination of the target vehicle by the utterance number counting unit 5212 is relatively large to the user.

Accordingly, information (for example, advertisement information belonging to the same genre of tastes) associated with a word of which the number of times of utterance counted for a place through which a target vehicle passes or a destination to which the target vehicle travels is relatively large can be provided to a user of the target vehicle as information associated with a movement intention of the user moving in the target vehicle.

The word of which the number of times of utterance of each of a plurality of words counted for each of position indicators or for each of destination indicators by the utterance number counting unit 5212 is relatively large may be stored in the storage unit 5200 in correlation with the position indicator or the destination indicator. The advertisement delivering unit 624 may provide information associated with the words stored in the storage unit 5200 in correlation with the position indicator corresponding to the position of the target vehicle or the destination indicator corresponding to the destination of the target vehicle to the user. Accordingly, a feature word map in which words (feature words) of which occupants in vehicles 3 passing through a place corresponding to the position indicator or vehicles 3 moving to the destination corresponding to the destination indicator talk relatively often are correlated with the position indicator or the destination indicator is constructed in the storage unit 5200 or the like. Accordingly, the advertisement delivering unit 624 can provide advertisement information associated with the words correlated with the position indicator corresponding to the position of the target vehicle or the destination indicator corresponding to the destination of the target vehicle in the feature word map as information matching a purpose of actions of a user in the target vehicle.

In this embodiment, the advertisement delivering unit 624 may provide advertisement information to the user by delivering the advertisement information to a digital signage terminal 7 installed near a road on which the target vehicle is located and displaying the advertisement information on the digital signage terminal 7.

Accordingly, it is possible to provide information matching a movement intention to a user in the target vehicle via the digital signage terminal 7 near the road on which the target vehicle is located. Since the display unit of the digital signage terminal 7 is easily included in the field of view of a user as a driver of the target vehicle, it is possible to facilitate a driver of a the target vehicle understanding of information.

In this embodiment, the advertisement delivering unit 624 may provide advertisement information to a user by delivering the advertisement information to a mobile terminal 4 carried by the user or the target vehicle (the vehicle 3).

Accordingly, it is possible to provide advertisement information matching a purpose of actions of a user via display on the display 45 of the mobile terminal 4 carried by the user in the target vehicle, display on the display device 35 of the target vehicle (the vehicle 3), or the like.

It may be possible to provide (notify) a user with delivered advertisement information by outputting of voice sound from a speaker mounted in the vehicle 3, a speaker built in the mobile terminal 4, or the like.

While an embodiment of the disclosure has been described above in detail, but the disclosure is not limited to such a specific embodiment and can be modified and changed in various forms within the scope of the gist of the disclosure described in the appended claims.

First Modified Example

In the above-mentioned embodiment, the functions of the movement information management server 5 and the advertisement management server 6 may be embodied by one server (an example of an information providing device) or some functions of one server may be embodied by the other server.

Second Modified Example

In the above-mentioned embodiment, some functions of the movement information management server 5 and the advertisement management server 6 may be assigned to another server that can communication with both the movement information management server 5 and the advertisement management server 6.

Third Modified Example

In the above-mentioned embodiment, the functions of the utterance data storage processing unit 5209 and the feature word extracting unit 5210 are provided in the movement information management server 5, but may be provided in a plurality of vehicles 3. In this case, each of the plurality of vehicles 3 uploads information on a feature word extracted from contents of utterance (utterance data) to the movement information management server 5 using the DCM 31. Accordingly, since a feature word is extracted in each vehicle 3, contents of utterance of occupants in each vehicle 3 are not transmitted to a server side and it is thus possible to construct a system in which privacy of an occupant in each vehicle 3 is better protected.

Fourth Modified Example

In the above-mentioned embodiment, the movement information management system 1 and the advertisement management system 2 may not be configured on the premise of the used vehicle identifying unit 5205 and the used vehicle DB 5200E. Specifically, the movement information management server 5 and the advertisement management server 6 may perform the above-mentioned processes using a database (not illustrated) in which correspondence between vehicles 3 and mobile terminals 4 or users of the mobile terminals 4 is registered in advance by the users of the vehicles 3 instead of the used vehicle DB 5200E.

Fifth Modified Example

In the above-mentioned embodiment, the utterance number count DB 5200I is used for providing information to a user of a mobile terminal 4 in a vehicle 3, but may be used for another purpose.

For example, the utterance number count DB 5200I may be used for verification of advertising effects of a digital signage or a signboard which is installed near a road. Specifically, a counting result of the number of times of utterance of feature words in one or more road links connected to one end of a predetermined road link near which a digital signage or a signboard on which a predetermined advertisement is displayed or posted is installed is compared with a counting result of the number of times of utterance of feature words in one or more road links connected to the other end of the predetermined road link. Accordingly, since it is possible to ascertain change in the number of times of utterance of a feature word (a keyword) associated with the advertisement before and after the advertisement is watched, it is possible to verify advertising effects by analyzing a degree of change thereof or the like.

For example, the utterance number count DB 5200I may be used for verification of a correlation between a POI as a destination and a keyword associated with the POI (for example, a keyword in a catch phrase used in an advertisement or a pamphlet). Specifically, it is possible to ascertain a degree of permeability of a predetermined keyword or the like by comparison with the absolute values of the number of time of utterance of the keyword in counting results of the number of times of utterance of feature words counted for a predetermined POI as a destination, comparison with the relative number of times of utterance of another word, or the like.

For example, the utterance number count DB 5200I may be used for extracting points of improvement such as a road infrastructure as a destination. Specifically, by collecting words associated with impressions when passing through a road of occupants which are included in a plurality of words as feature words and which are counted for each road link or for each crossing (node), it is possible to extract specific points of improvement in the road infrastructure. More specifically, a place in which a road condition is bad may be extracted, a place in which a sign is not viewed well may be extracted, or a crossing in which a traffic flow is bad may be extracted.

What is claimed is:

1. An information providing device comprising:
    an utterance contents acquiring unit configured to acquire contents of utterance of an occupant in each of a plurality of vehicles;
    a feature word extracting unit configured to extract a feature word from the contents of utterance acquired by the utterance contents acquiring unit;
    an utterance-time information acquiring unit configured to acquire information on a position or information on a destination of the vehicle when the feature word has been uttered;
    an utterance number counting unit configured to count the number of times of utterance of each of a plurality of different words which are extracted as the feature word by the feature word extracting unit for each of position indicators including a road link, a crossing, and an area corresponding to the position of the vehicle or for each of destination indicators including a point of interest and an area corresponding to the destination of the vehicle;
    a current information acquiring unit configured to acquire information on a position or information on a destination of a predetermined target vehicle boarded by a user; and
    an information providing unit configured to provide information to the user based on the counting results of the position indicator corresponding to the position of the target vehicle or the destination indicator corresponding to the destination of the target vehicle from the utterance number counting unit.

2. The information providing device according to claim 1, wherein the utterance number counting unit is configured to count the number of times of utterance of each of a plurality of different words which are extracted as the feature word from the contents of utterance after a predetermined time point by the feature word extracting unit for each of position indicators corresponding to the position of the vehicle or for each of destination indicators corresponding to the destination of the vehicle.

3. The information providing device according to claim 1, wherein the information providing unit is configured to provide information associated with a word of which the number of times of utterance of each of the plurality of words counted for each of position indicators corresponding to the position of the target vehicle or for each of destination indicators corresponding to the destination of the target vehicle by the utterance number counting unit is relatively large to the user.

4. The information providing device according to claim 1, further comprising a storage unit configured to store a word of which the number of times of utterance of each of the plurality of words counted for each of position indicators or for each of destination indicators by the utterance number counting unit is relatively large in correlation with the position indicator or the destination indicator,
wherein the information providing unit is configured to provide information associated with a word which is stored in the storage unit in correlation with the position indicator corresponding to the position of the target vehicle or the destination indicator corresponding to the destination of the target vehicle to the user.

5. The information providing device according to claim 1, wherein the information providing unit is configured to provide the information to the user by delivering the information to a digital signage installed near a road on which the target vehicle is located and displaying the information on the digital signage.

6. The information providing device according to claim 1, wherein the information providing unit is configured to provide the information to the user by delivering the information to a mobile terminal carried by the user or the target vehicle.

7. An information providing system comprising:
an utterance contents acquiring unit disposed in each of a plurality of vehicles and configured to acquire contents of utterance of an occupant;
a feature word extracting unit disposed in each of the plurality of vehicles and configured to extract a feature word from the contents of utterance acquired by the utterance contents acquiring unit;
an utterance-time information acquiring unit disposed in a server that is able to communicate with the plurality of vehicles and configured to acquire position information or destination information of the vehicle when the feature word has been uttered;
an utterance number counting unit disposed in the server and configured to count the number of times of utterance of each of a plurality of different words which are extracted as the feature word by the feature word extracting unit for each of position indicators including a road link, a crossing, and an area corresponding to the position of the vehicle or for each of destination indicators including a point of interest and an area corresponding to the destination of the vehicle;
a current information acquiring unit disposed in the server and configured to acquire position information or destination information of a predetermined target vehicle boarded by a user; and
an information providing unit disposed in the server and configured to provide information to the user based on the counting results of the position indicator corresponding to the position of the target vehicle or the destination indicator corresponding to the destination of the target vehicle from the utterance number counting unit.

8. An information providing system comprising:
a vehicle including a first processor programmed to acquire contents of utterance of an occupant and to extract a feature word from the contents of utterance; and
a server including
a communication device that communicates with the vehicle, and
a second processor programmed to acquire position information or destination information of the vehicle when the feature word has been uttered, to count the number of times of utterance of each of a plurality of different words which are extracted as the feature word for each of position indicators including a road link, a crossing, and an area corresponding to the position of the vehicle or for each of destination indicators including a point of interest and an area corresponding to the destination of the vehicle, to acquire position information or destination information of a predetermined target vehicle boarded by a user, and to provide information to the user based on the counting results of the position indicator corresponding to the position of the target vehicle or the destination indicator corresponding to the destination of the target vehicle.

* * * * *